United States Patent
Kovacevich et al.

(10) Patent No.: US 7,516,914 B2
(45) Date of Patent: *Apr. 14, 2009

(54) BI-DIRECTIONAL DEVICE

(75) Inventors: Ian D. Kovacevich, Charlotte, NC (US);
Kevin J. Dahlquist, Charlotte, NC (US);
Tom J. Philpott, Charlotte, NC (US);
Daniel Lee Bizzell, Charlotte, NC (US)

(73) Assignee: Enventys, LLC, Charlotte, NC (US)

( * ) Notice: Subject to any disclaimer, the term of this patent is extended or adjusted under 35 U.S.C. 154(b) by 338 days.

This patent is subject to a terminal disclaimer.

(21) Appl. No.: 11/123,900

(22) Filed: May 6, 2005

(65) Prior Publication Data

US 2005/0247813 A1 Nov. 10, 2005

Related U.S. Application Data

(60) Provisional application No. 60/569,304, filed on May 7, 2004, provisional application No. 60/608,397, filed on Sep. 9, 2004, provisional application No. 60/656,335, filed on Feb. 25, 2005.

(51) Int. Cl.
*B65H 75/38* (2006.01)
(52) U.S. Cl. .................................. 242/388.8; 242/395
(58) Field of Classification Search ................. 242/388, 242/388.1, 388.2, 388.3, 388.4, 388.6, 388.7, 242/388.8, 588, 588.2, 395, 395.1; 24/712.1, 24/712.2, 712.3; 36/50.1; 2/421, 425, 417
See application file for complete search history.

(56) References Cited

U.S. PATENT DOCUMENTS

| | | |
|---|---|---|
| 176,926 A | 5/1876 | Burk |
| 757,893 A | 4/1904 | Daughters |
| 813,574 A | 2/1906 | McNames |
| 881,772 A | 3/1908 | Canney |
| 2,536,875 A | 1/1951 | Dalrymple |
| 2,601,409 A | 6/1952 | McArthur et al. |
| 2,611,284 A | 9/1952 | Albee |
| 2,991,523 A | 7/1961 | Del Conte |

(Continued)

FOREIGN PATENT DOCUMENTS

JP     6171836     6/1994

*Primary Examiner*—Peter M Cuomo
*Assistant Examiner*—William E Dondero
(74) *Attorney, Agent, or Firm*—Tillman Wright, PLLC; James D. Wright; Chad D. Tillman

(57) ABSTRACT

A bi-directional device includes a rotatable control handle, a first line, and a second line, each extending from a housing. When the control handle is rotated in a first rotational direction, at least a portion of the first line is drawn into the housing. When the control handle is rotated in a second rotational direction, opposite the first rotational direction, at least a portion of the second line is drawn into the housing. Optionally, the control handle is positionable into each of a drive position and a release position. The control handle is generally biased into the drive position by an elastic force such as that of a spring. While the control handle is at the drive position, those portions of the lines drawn into the housing by rotations of the control handle are prevented from being withdrawn. When the release position of the control handle is obtained, drawn portions of the lines can be withdrawn from the housing.

17 Claims, 23 Drawing Sheets

U.S. PATENT DOCUMENTS

| | | |
|---|---|---|
| 3,206,855 A | 9/1965 | Fletcher |
| 5,042,177 A | 8/1991 | Schoch |
| 5,507,471 A | 4/1996 | Mercurio |
| 5,934,599 A | 8/1999 | Hammerslag |
| 6,202,953 B1 | 3/2001 | Hammerslag |
| 6,289,558 B1 | 9/2001 | Hammerslag |
| 2002/0095750 A1 | 7/2002 | Hammerslag |
| 2003/0204938 A1 | 11/2003 | Hammerslag |
| 2005/0247813 A1 | 11/2005 | Kovacevich et al. |
| 2006/0015988 A1 | 1/2006 | Philpott et al. |
| 2006/0156517 A1 | 7/2006 | Hammerslag et al. |

BI-DIRECTIONAL DEVICE

CROSS-REFERENCE TO RELATED APPLICATION

This application is a nonprovisional of and claims priority to each of U.S. Provisional Patent Application No. 60/569,304, filed May 7, 2004, which is hereby incorporated herein by reference, U.S. Provisional Patent Application No. 60/608,397, filed Sep. 9, 2004, which is hereby incorporated herein by reference, and U.S. Provisional Patent Application No. 60/656,335, filed Feb. 25, 2005, which is hereby incorporated herein by reference.

COPYRIGHT STATEMENT

All of the material in this patent document, including that of the figures, is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

FIELD OF THE INVENTION

The present invention relates generally to a bi-directional device for adjustably tensioning flexible lines and adjustably controlling lengths of flexible lines, and more specifically, to a rotary bi-directional device having spools for winding and tensioning flexible lines.

SUMMARY OF THE INVENTION

The present invention includes many aspects and features. Moreover, while many aspects and features relate to bi-directional devices for tensioning lines, and are described in the context of adjustably fitted articles of protective apparel such as helmets, the present invention is not limited to use only in protective apparel, as will become apparent from the following summaries and detailed descriptions of aspects, features, and one or more embodiments of the present invention.

Accordingly, one aspect of the present invention relates to a bi-directional device that includes a housing. A rotatable control handle, a first line, and a second line each extend from the housing. When the control handle is rotated in a first rotational direction, at least a portion of the first line is drawn into the housing. When the control handle is rotated in a second rotational direction, opposite the first rotational direction, at least a portion of the second line is drawn into the housing.

In variations of this aspect, the control handle is positionable into each of a drive position and a release position. The control handle is generally biased into the drive position by an elastic force such as that of a spring. While the control handle is at the drive position, those portions of the lines drawn into the housing by rotation of the control handle are prevented from being withdrawn from the housing. When the release position of the control handle is obtained, portions of the lines can be withdrawn.

In one or more particular variations of this aspect, the release position of the control handle is obtained by pulling the control handle along the axis about which it turns, against the elastic force of a spring.

Another aspect of the present invention relates to a bi-directional device having a first spool and a second spool coupled to a rotatable axle. When the axle is rotated in a first rotational direction, the first spool is rotated. When the axle is rotated in a second rotational direction, opposite the first rotational direction, the second spool is rotated.

Optionally, the bi-directional device of this aspect includes a first line attached to the first spool and a second line attached to the second spool. When the axle is rotated in the first rotational direction, the first line is wound about the first spool by rotation of the spool. When the axle is rotated in the second rotational direction, the second line is wound about the second spool by rotation of the spool.

Furthermore, the axle of this aspect of the invention optionally is positionable into a release position. When the axle is positioned at the release position, unwinding of the lines from the spools is permitted.

Yet another aspect of the invention relates to a spool assembly having a spool, a first crown gear for rotating the spool in a first rotational direction, and a second crown gear for preventing the spool from rotating in a second rotational direction, opposite the first rotational direction. The first and second crown gears are biased away from the spool for engaging respective driving and locking gears. The second crown gear is disengagable from the locking gear to allow rotation of the spool in the second rotational direction.

BRIEF DESCRIPTION OF THE DRAWINGS

One or more embodiments of the present invention will now be described in detail with reference to the accompanying drawings briefly described below, wherein the same elements are referred to with the same reference numerals.

DETAILED DESCRIPTION OF THE INVENTION

Figure 1A:
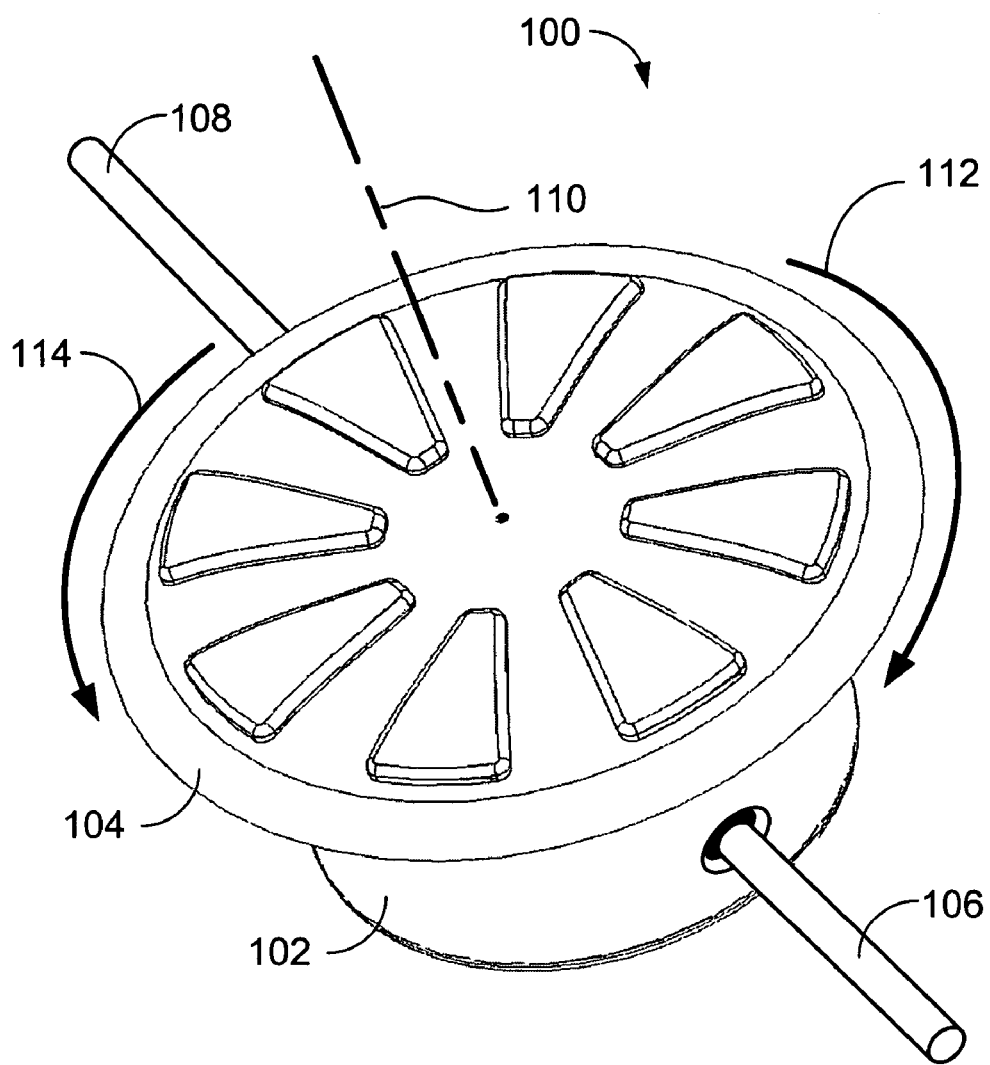
FIG. 1A is a perspective view of a bi-directional device according to an embodiment of the invention.

As a preliminary matter, it will readily be understood by one having ordinary skill in the relevant art ("Ordinary Artisan") that the present invention has broad utility and application. Furthermore, any embodiment discussed and identified as being "preferred" is considered to be part of a best mode contemplated for carrying out the present invention. Other embodiments also may be discussed for additional illustrative purposes in providing a full and enabling disclosure of the present invention. Moreover, many embodiments, such as adaptations, variations, modifications, and equivalent arrangements, will be implicitly disclosed by the embodiments described herein and fall within the scope of the present invention.

Accordingly, while the present invention is described herein in detail in relation to one or more embodiments, it is to be understood that this disclosure is illustrative and exemplary of the present invention, and is made merely for the purposes of providing a full and enabling disclosure of the present invention. The detailed disclosure herein of one or more embodiments is not intended, nor is to be construed, to limit the scope of patent protection afforded the present invention, which scope is to be defined by the claims and the equivalents thereof. It is not intended that the scope of patent protection afforded the present invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection afforded the present invention is to be defined by the appended claims rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

Furthermore, it is important to note that, as used herein, "a" and "an" each generally denotes "at least one," but does not exclude a plurality unless the contextual use dictates otherwise. Thus, reference to "a picnic basket having an apple" describes "a picnic basket having at least one apple" as well as "a picnic basket having apples." In contrast, reference to "a picnic basket having a single apple" describes "a picnic basket having only one apple."

When used herein to join a list of items, "or" denotes "at lease one of the items," but does not exclude a plurality of items of the list. Thus, reference to "a picnic basket having cheese or crackers" describes "a picnic basket having cheese without crackers", "a picnic basket having crackers without cheese", and "a picnic basket having both cheese and crackers." Finally, when used herein to join a list of items, "and" denotes "all of the items of the list." Thus, reference to "a picnic basket having cheese and crackers" describes "a picnic basket having cheese, wherein the picnic basket further has crackers," as well as describes "a picnic basket having crackers, wherein the picnic basket further has cheese."

Turning now to FIG. 1A, an embodiment of a bi-directional device 100 according to the invention includes a housing 102 from which extends a rotatable control handle 104, a first flexible line 106, and a second flexible line 108. The control handle 104 is rotatable relative to the housing about an axis 110. When the control handle 104 is rotated in a first rotational direction 112 about the axis 110, at least a portion of the first line 106 is drawn into the housing 102. When the control handle 104 is rotated in a second rotational direction 114, opposite the first rotational direction 112, at least a portion of the second line 108 is drawn into the housing 102. The lengths of the portions of the lines that extend from the housing are thereby shortened by respective rotations of the control handle about the axis in the two rotational directions.

Furthermore, the control handle 104 is positionable along the axis 110 within a range. A drive position (FIG. 1B) of the control handle is obtained when the control handle is positioned at the inward extreme of the range relative to the housing 102. A release position (FIG. 1E) of the control handle is obtained when the control handle is positioned at the outward extreme of the range relative to the housing. The drive position is generally obtained by the bi-directional device by way of an elastic force among internal components of the device that biases the control handle into the drive position.

Figure 1B:
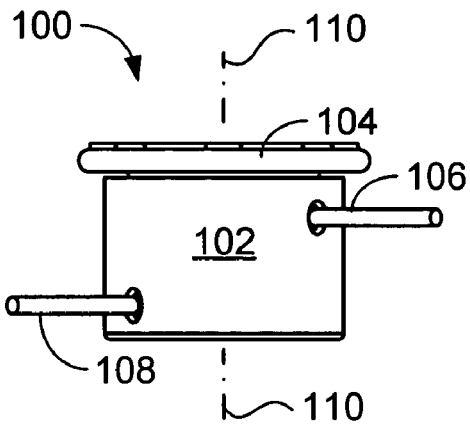
FIG. 1B is a side view showing a drive position obtained by the bi-directional device of FIG. 1A.
Figure 1E:
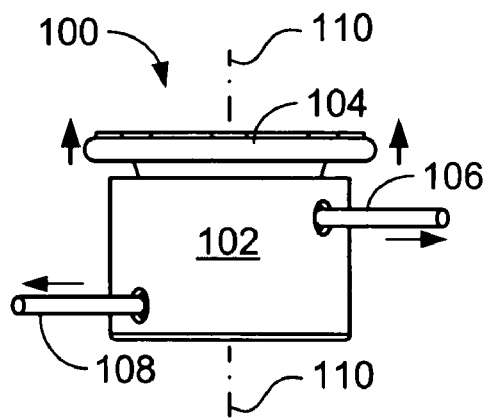
FIG. 1E is side view of showing a release position obtained by the bi-directional device of FIG. 1A.
Figure 1C:
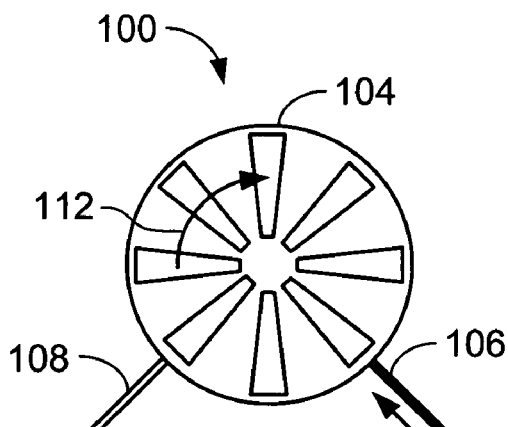
FIG. 1C is a top view of showing a line portion drawn into the bi-directional device of FIG. 1A.
Figure 1F:
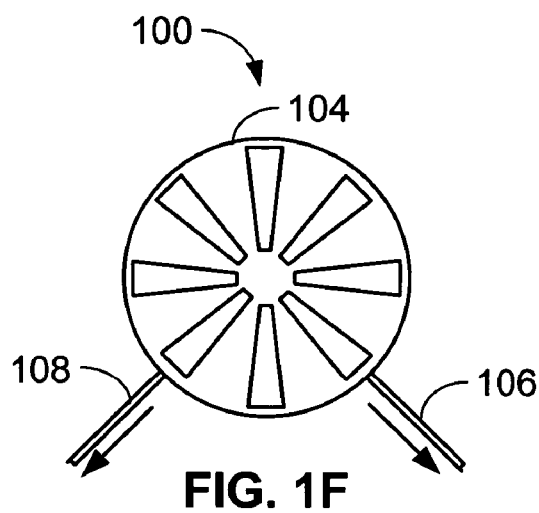
FIG. 1F is a top view showing line portions withdrawn from the bi-directional device of FIG. 1A.
Figure 1D:
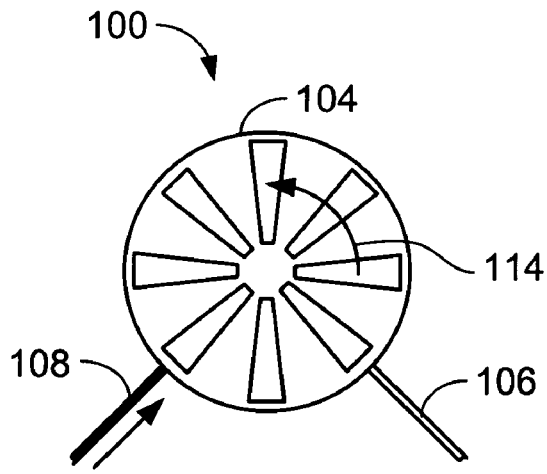
FIG. 1D is a top view showing another line portion drawn into the bi-directional device of FIG. 1A.

When the control handle 104 is positioned at the drive position (FIG. 1B), rotation of the control handle about the axis 110 in the first rotational direction 112 results in at least a portion of the first line 106 being drawn into the housing (FIG. 1C). Furthermore, when the control handle is positioned at the drive position, rotation of the control handle about the axis 110 in the second rotational direction 114 results in at least a portion of the second line 108 being drawn into the housing (FIG. 1D). The portions of the lines drawn into the housing by rotation of the handle are prevented from being withdrawn as long as the control handle remains in the drive position (FIG. 1B).

However, when an external pulling force overcomes the elastic force and displaces the control handle from the drive position (FIG. 1B) and into the release position (FIG. 1E), the portions of the lines 106,108 that were drawn into the housing by respective rotations of the control handle are no longer prevented from being withdrawn and can be pulled from the housing. Thus, the lengths of the lines extending from the housing can be drawn into the housing by rotating the control handle at the drive position (FIG. 1B), and, can be withdrawn from the housing when the control handle is pulled into the release position (FIG. 1E).

Flexible lines 106,108 are shown in FIG. 1 as mono-filament lines though the various embodiment of bi-directional devices described herein are useful as well for drawing and tensioning multi-filament lines. Indeed, "flexible line," as used herein, refers to many types of elongate flexible lines having various constructions and formed of various materials having respective tensile and flexible properties. Exemplary constructions include, but are not limited to: mono-filament lines, multi-filament lines, wound lines, woven lines, braided lines, layered lines, strings, ropes, cords, threads, twines, intertwined strands, chains, tethers, belts, bands, straps, and combinations thereof. Exemplary materials include, but are not limited to: natural fibers including hemp, cotton, linen, hide, gut, and sinew; synthetic and plastic fibers such as nylon, polyethylene, and fluorocarbon; lines formed of metals such as wires and cables; and, combinations thereof.

Components of the bi-directional device 100 including the housing 102 and control handle 104 are preferably formed of injection molded plastic though other materials and manufacturing techniques are within the scope of the discussions herein of various embodiments of bi-directional devices. For example, the components of the bi-directional device can be formed of molded metal or can be machined from solid material such as steel or plastic.

Figure 2A:
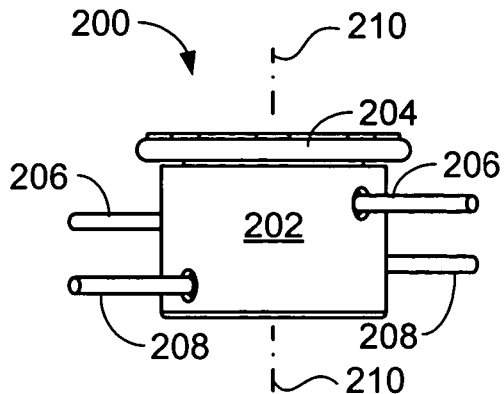
FIG. 2A is a side view of showing a drive position obtained by another embodiment of a bi-directional device according to the invention.
Figure 2D:
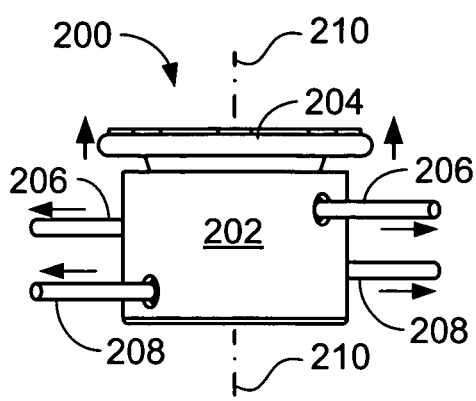
FIG. 2D is a side view showing a release position obtained by the bi-directional device of FIG. 2A
Figure 2B:
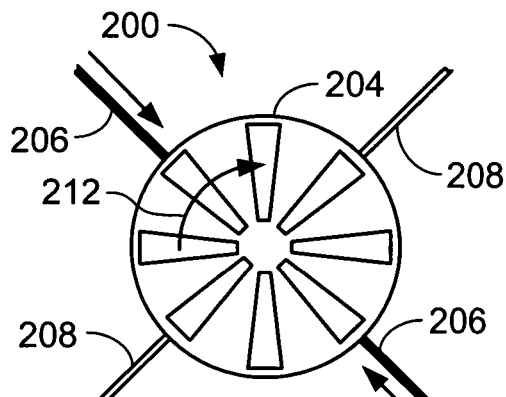
FIG. 2B is a top view showing line portions drawn into the bi-directional device of FIG. 2A.
Figure 2E:
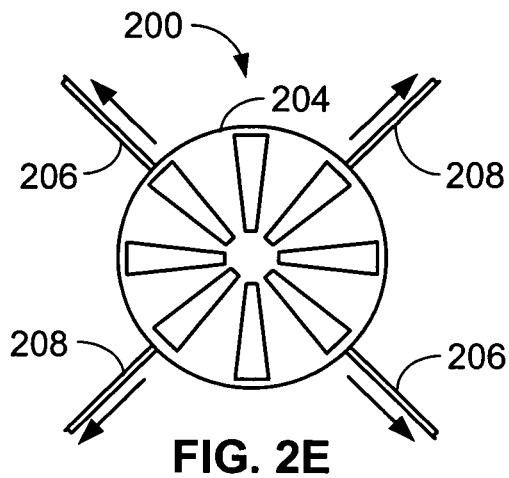
FIG. 2E is top view showing line portions withdrawn from the bi-directional device of FIG. 2A
Figure 2C:
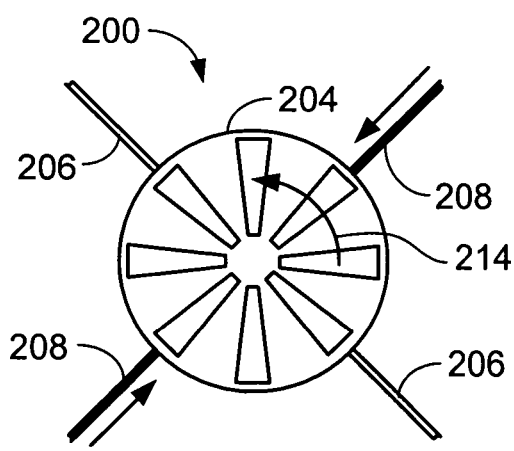
FIG. 2C is a top view showing other line portions drawn into the bi-directional device of FIG. 2A

As shown in FIGS. 2A-2E, another embodiment of a bi-directional device 200 according to the invention includes a housing 202, multiple first lines 206, multiple second lines 208, and a rotatable control handle 204 that is positionable into a drive position (FIG. 2A) and a release position (FIG. 2D). The drive position is generally obtained by the bi-directional device by way of an elastic force among internal components of the device that biases the control handle toward the housing and into the drive position. The release position is obtained when a user of the bi-directional device 200 pulls the handle 204 along the axis 210, displacing the handle from the drive position.

When the control handle 204 is positioned at the drive position (FIG. 2A) and rotated in the first rotational direction 212 (FIG. 2B), at least a portion of each first line 206 is drawn into the housing 202. Furthermore, when the control handle 204 is positioned at the drive position and rotated in the second rotational direction 214 (FIG. 2C), at least a portion of each of second line 208 is drawn into the housing. The portions of the lines drawn into the housing by rotations of the handle are prevented from being withdrawn as long as the control handle remains in the drive position.

When the control handle 204 is positioned at the release position (FIG. 2D-2E), portions of the lines 206,208 can be withdrawn from the housing. In particular, those portions that were previously drawn into the housing by respective rotations of the control handle (FIGS. 2B-2C) can be withdrawn by pulling the lines from the housing.

Several components of the bi-directional device 200 (FIGS. 2A-2E) that are within the housing 202 are diagrammatically shown in FIGS. 3A-3F. These components include an axle 222 rotatable about the axis 210, a first spool assembly 224 coupled to the axle 222, and a second spool assembly 226 coupled to the axle 222. The first flexible lines 206 are attached to the first spool assembly 224 for winding thereon, and the second flexible lines 208 are attached to the second spool assembly 226 for winding thereon. The axle 222 (FIGS. 3A-3F) is attached to the control handle 204 (FIGS. 2A-2E) such that when the control handle is travels along and rotates about the axis 210, the axle 222 travels and rotates with the control handle.

Figure 3A:
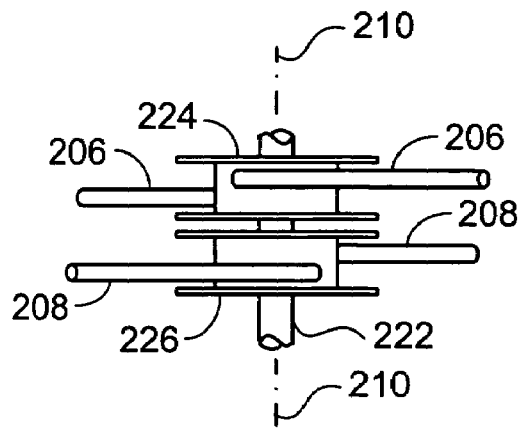
FIG. 3A is a diagrammatical view of several of the components of the bi-directional device of FIG. 2A.

In particular, when the control handle 204 is positioned at the drive position (FIG. 2A), the axle 222 is positioned along the axis 210 into a drive position as shown in FIG. 3A. When axle 222 is positioned at the drive position and rotated in the first rotational direction 212 (FIG. 3B), the first spool assembly 224 is thereby rotated in the first rotational direction and at least portions of the first lines 206 are thereby wound onto the first spool assembly. When the axle 222 is positioned at the drive position and rotated in the second rotational direction 214 (FIG. 3C), the second spool assembly is thereby rotated in the second rotational direction and at least portions of the second lines 208 are thereby wound onto the second spool assembly. Unwinding of the lines from the spools is prevented as long as the axle is positioned at the drive position.

Figure 3D:
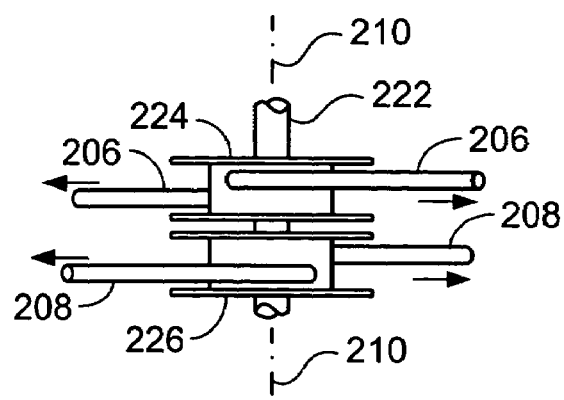
FIG. 3D is a diagrammatical view of a release position obtained by the components of FIG. 3A.
Figure 3B:
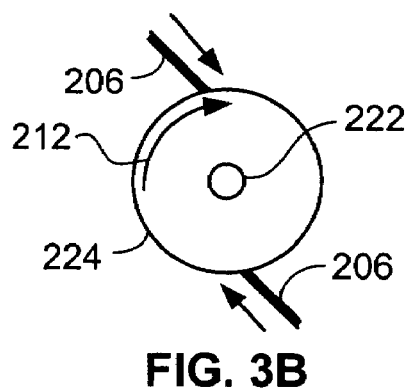
FIG. 3B is a diagrammatical view of lines winding onto a spool assembly of the bi-directional device of FIG. 3A.
Figure 3E:
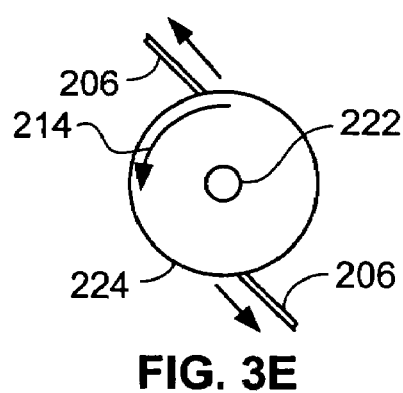
FIG. 3E is a diagrammatical view of lines unwinding from the spool assembly of FIG. 3B.
Figure 3C:
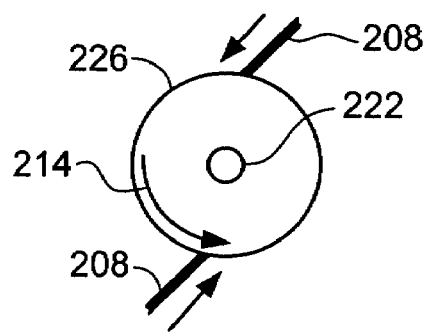
FIG. 3C is diagrammatical view of other lines winding onto another spool assembly of the bi-directional device of FIG. 3A.
Figure 3F:
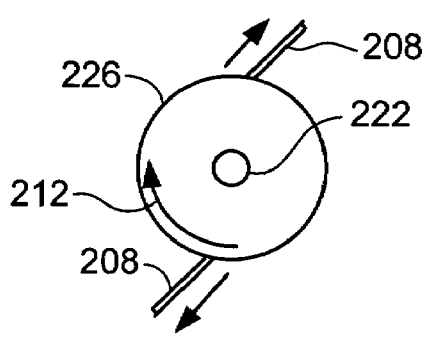
FIG. 3F is a diagrammatical view of lines unwinding from the spool assembly of FIG. 3C.

Furthermore, when the control handle 204 is positioned at the release position (FIG. 2D), the axle 222 is positioned into a release position as shown in FIG. 3D. As shown in FIG. 3E, when the axle obtains the release position, and external pulling forces are applied to the first lines 206, the first spool assembly 224 is permitted to rotate in the second rotational direction 214 thereby permitting unwinding of the first lines responsively to the torque that results from the external pulling forces. Similarly, as shown in FIG. 3F, when the axle obtains the release position, and external pulling forces are applied to the second lines 208, the second spool assembly 226 is permitted to rotate in the first rotational direction 212 thereby permitting unwinding of the second lines responsively to the torque that results from the external pulling forces.

Figure 4A:
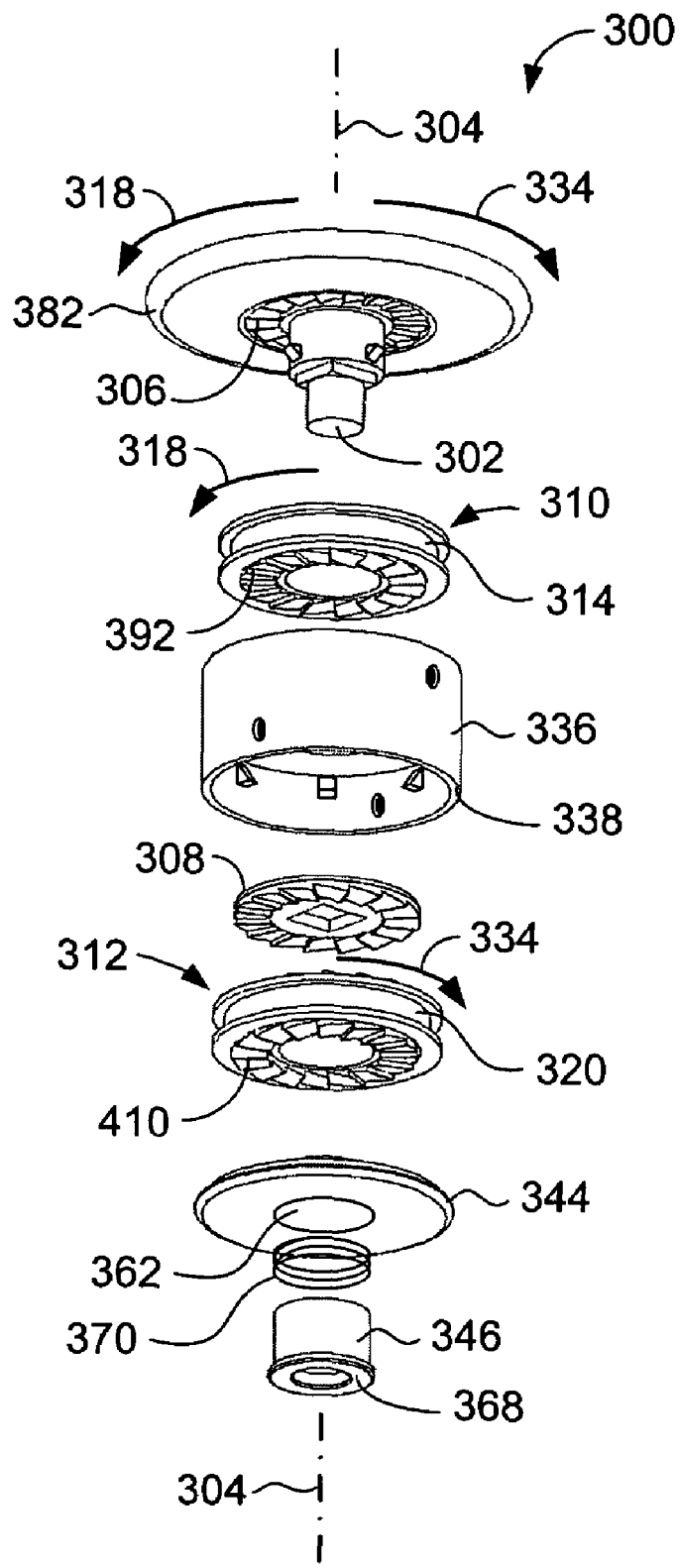
FIG. 4A is an exploded perspective view of a bi-directional device according to an embodiment of the invention.
Figure 4B:
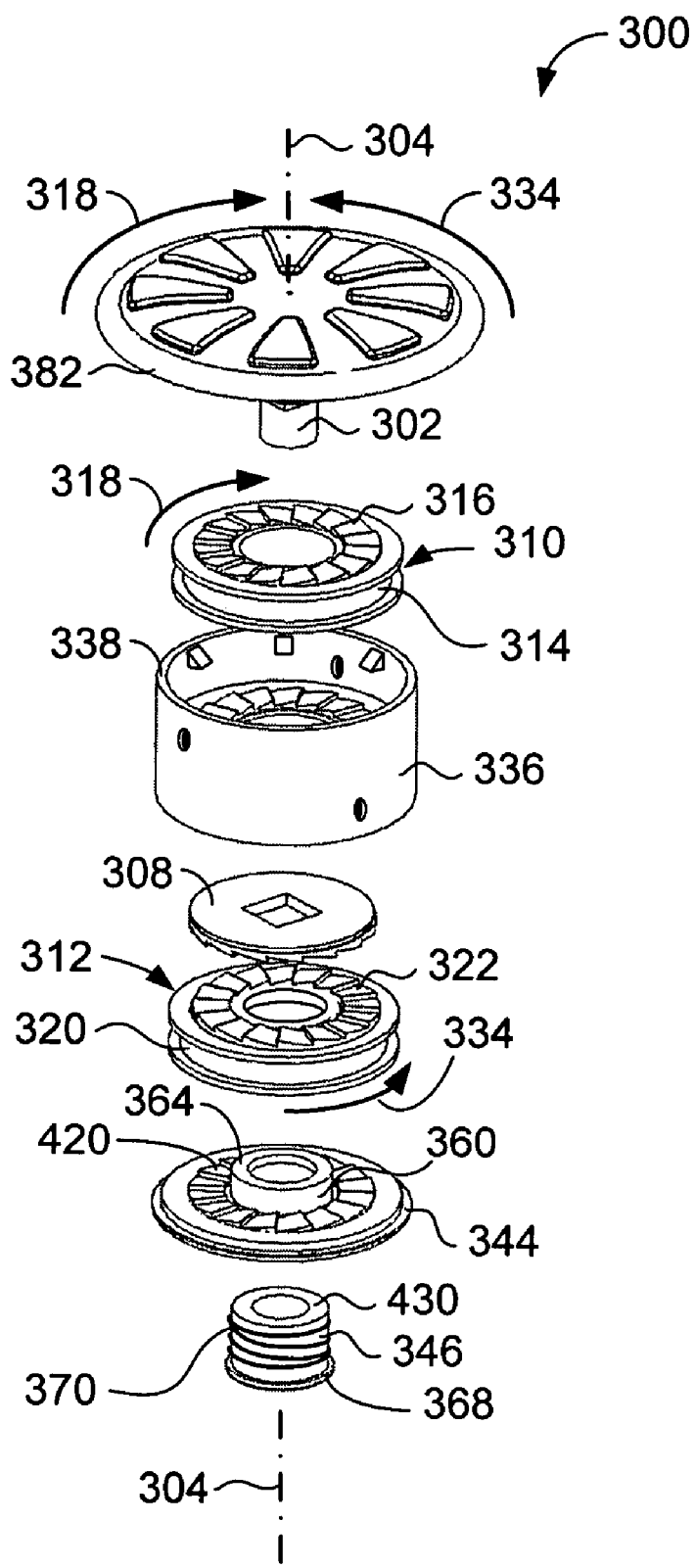
FIG. 4B is another exploded perspective view of the bi-directional device of FIG. 4A.

As shown in FIGS. 4A-4B, yet another embodiment of a bi-directional device 300 includes an axle 302 rotatable about an axis 304, a first driving component 306 attached to the axle 302, a second driving component 308, a first spool assembly 310, and a second spool assembly 312.

The first spool assembly 310 includes a first spool 314 and a third driving component 316 (FIG. 4B) coupled to the first spool 314. The third driving component 316 is engagable by the first driving component 306 for rotation of the first spool assembly when the axle 302 is rotated in a first rotational direction 318 about the axis 304. Any number of flexible lines attached to the first spool 314 are wound about the first spool upon rotation of the first spool in the first rotational direction.

The second spool assembly 312 includes a second spool 320 and a fourth driving component 322 (FIG. 4B) coupled to the second spool 320. The fourth driving component 322 is engagable by the second driving component 308 for rotation of the second spool assembly when the axle 302 is rotated in a second rotational direction 334 about the axis 304. Any number of flexible lines attached to the second spool 320 are wound about the second spool upon rotation of the second spool in the second rotational direction.

The bi-directional device 300 further includes a housing 336. The housing 336 includes a continuous substantially circular wall 338 defining a cylindrical interior concentric with the axis 304. An annular flange 340 (FIG. 5A-5B) is connected along its outer circular margin to the interior side of the wall 338 and extends radially inwardly from the wall. A number of capture teeth 342 extend radially inwardly from the wall 338 (FIG. 5B). In assembling the device, the first spool assembly 310 is pressed into the cylindrical interior of the wall 338 past the capture teeth 342 and is retained by the capture teeth within the housing between the annular flange 340 and the capture teeth 342.

As shown in FIGS. 4A-4B, the housing 336 further includes a base 344 that snaps into attachment with the wall 338. In assembling the device, the second driving component 308 and the second spool assembly 312 are disposed within the cylindrical interior of the wall 338 and the base 344 is snapped into attachment with the wall. The second driving component 308 is thereby captured between the annular flange 340 (FIG. 5A) and the second spool assembly 312; and, the second spool assembly is thereby captured between the second driving component and the base 344.

Furthermore, in assembling the device, the axle 302 is passed through the first spool assembly 310, through the housing 338, through the second driving component 308, through the second spool assembly 312, partially through the base 344, and into a retention cap 346. The axle 302 is received and retained by the retention cap 346 in a press-fit attachment. Similarly, the base 344 snaps into attachment with the wall 338 in a press-fit attachment. These press-fit attachments may be further supported, for example by locking grooves and rings, set screws, cotter pins, adhesives, and welding. In another embodiment of a bi-directional device, the wall of the housing, the base, the axle, and the retention cap each have threaded portions such that, in assembling that device, the base is screwed into the wall of the housing, and the retention cap is screwed onto the axle.

A base cylinder 360 (FIG. 4B) is attached to the base 344 and extends along the axis 304. A well 362 (FIG. 4A) is defined within the interior of the base cylinder for receiving the retention cap 346. A capture flange 364 (FIG. 4B) extends radially inwardly from the base cylinder 360 at an end of the base cylinder opposite its attachment to the base 344.

The retention cap 346 is dimensioned to pass into the well 362 of the base cylinder and partially through the capture flange 364. A capture flange 368 extends radially outward from the retention cap 346 to prevent the retention cap from passing completely through the base 344. The capture flange 368 of the retention cap 346 is dimensioned such that it will pass into the well 362, and is rotatable therein, but will not pass through the capture flange 364 of the base cylinder 360. Travel of the retention cap into the housing is thereby limited by abutment of the capture flange of the retention cap with that of the base cylinder.

A biasing spring 370 is disposed between the retention cap 346 and base 344 within the well 362. The biasing spring 370 is generally compressed between the capture flange 368 of the retention cap and the capture flange 364 of the base cylinder 360, and generally biases the retention cap away from the base 344 and out of the housing 336 with an elastic force of the biasing spring. Insofar as the axle 302 is retained by the retention cap 346 upon assembly of the device 300, the axle 302 is biased toward the base 344 and into the housing 336 by the elastic force of the biasing spring 370. The biasing spring 370 is preferably formed of spring steel though other mechanisms for providing an elastic force to bias the axle toward the base are within the scope of this discussion.

Figure 5A:
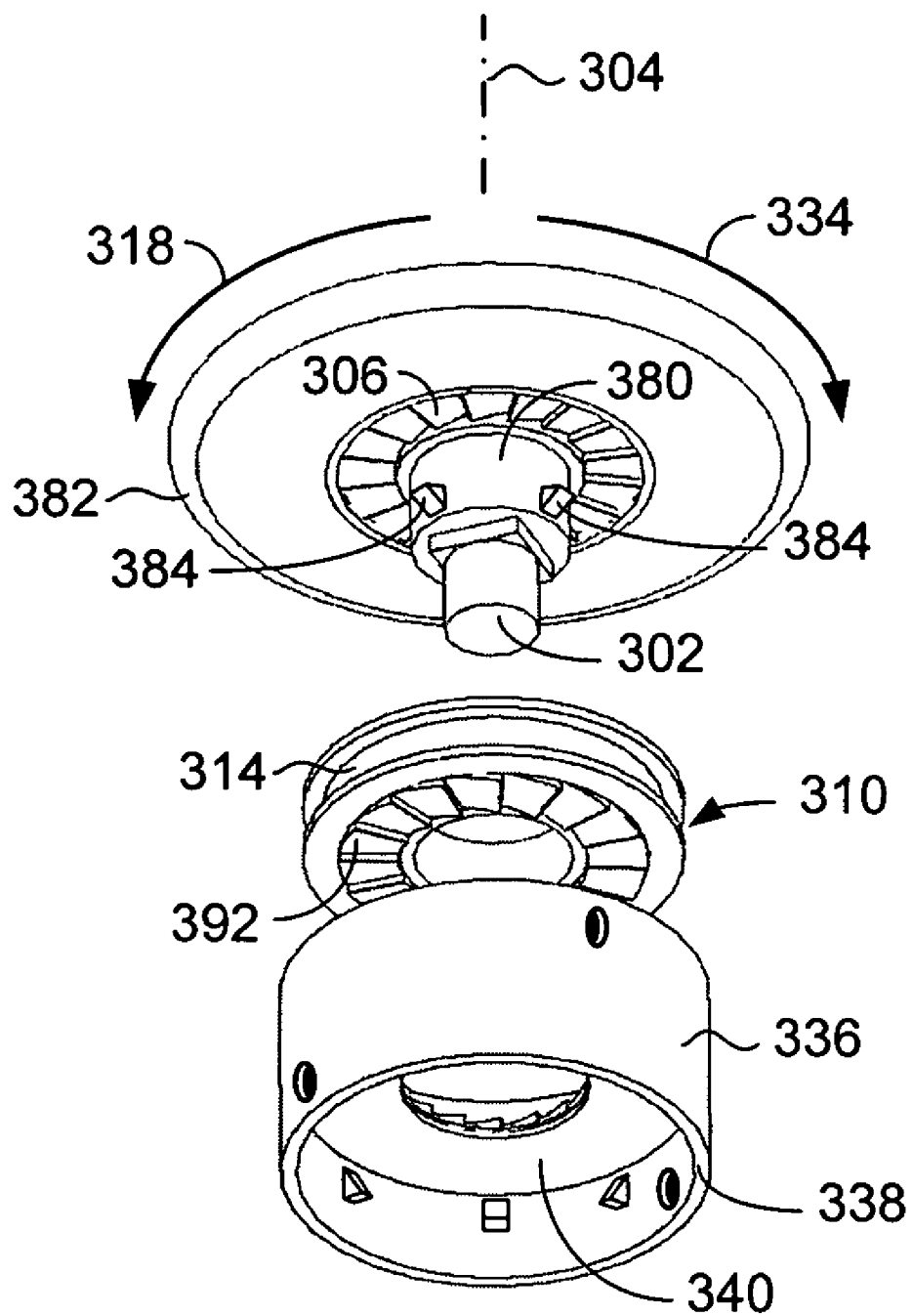
FIG. 5A is an exploded perspective view of particular components of the bi-directional device of FIG. 4A.
Figure 5B:
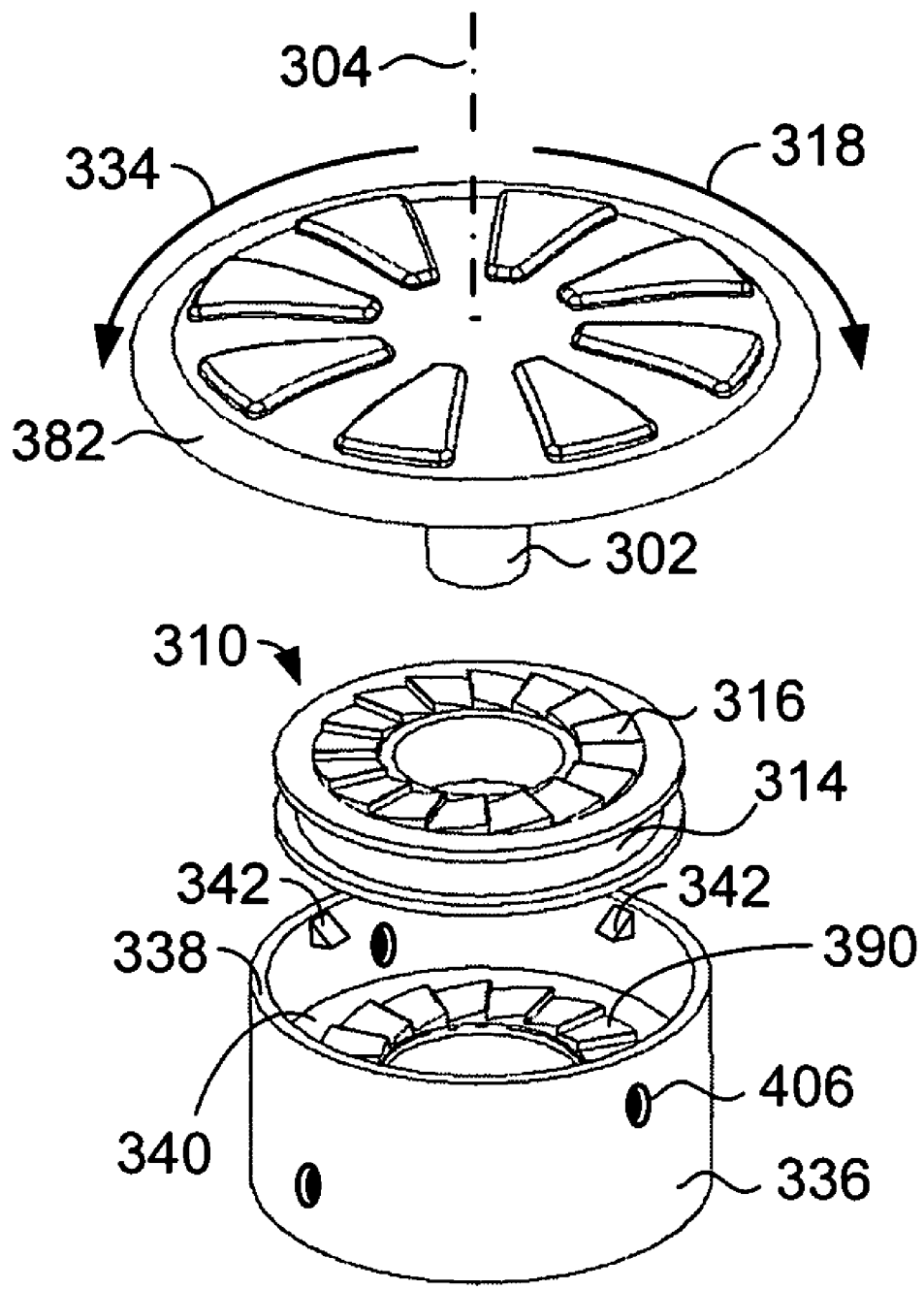
FIG. 5B is another exploded perspective view of the components of FIG. 5A.

As shown in FIGS. 5A-5B, the axle 302 includes a first axle portion 380 (FIG. 5A) to which is attached the first driving component 306 and a control handle 382. A number of capture teeth 384 extend radially outward from the first axle portion 380 for retaining the first spool assembly 310 on the first axle portion 380. In assembling the bi-directional device 300 (FIGS. 4A-4B), the first axle portion 380 is passed through the first spool assembly 320 such the capture teeth 384 are pressed through the first spool assembly and retain the assembly on the first axle portion between the capture teeth and the first driving component 306. The first spool assembly 320 is then conditionally rotatable about the first axle portion 380.

Insofar as the axle 302 is retained by the retention cap 346 and is thereby biased into the housing 336 by way of the elastic force of the biasing spring 370 (FIG. 4A), the first driving component 306 (FIG. 5A) attached to the axle is biased into abutment and engagement with the third driving component 316 (FIG. 5B) that is coupled to the first spool 314. A drive position of the axle for the rotation of spools is thereby defined and generally obtained when the first driving component 306 abuts the third driving component 316. The elastic force of the biasing spring 370 generally maintains the axle 302 in the drive position.

When the drive position of the axle 302 is obtained, and the axle is rotated in the first rotational direction 318 about the axis 304, the first driving component 306 engages the third driving component 316 thereby rotating the first spool 314 in the first rotational direction 318 about the axis 304 (FIGS. 5A-5B). However, when the axle 302 is rotated in the second rotational direction 334, the first spool 314 is not rotated.

In this embodiment, as shown in FIGS. 5A-5B, the first and third driving components 306,316 include one-way crown gears that engage when the first driving component 306 is rotated in one rotational direction, namely the first rotational direction 318. Slipping is permitted between the first and third driving components when the first driving component 306 is rotated in the other rotational direction, namely the second rotational direction 334. At least slight travel of the third driving component 316 along the axis 304 is permitted against the elastic force of a wave spring, as shown in FIGS. 6A-6B, to facilitate slipping between the first driving component and third driving component when the axle is rotated in the second rotational direction.

A first locking component 390 (FIG. 5B) is attached to the annular flange 340 facing the first spool assembly 310. A third locking component 392 (FIG. 5A) is coupled to the first spool 314 facing the annular flange 340. When the axle 302 obtains the drive position, the third locking component 392 abuts the first locking component 390 thereby preventing the first spool 314 from rotating in the second rotational direction 334 about the axis 304. As the first spool 314 is rotated in the first rotational direction 318, the third locking component 392 slips relative to the first locking component 390. That is, though abutment of the third locking component 392 and first locking component 390 is maintained when the axle 302 obtains the drive position, the engagement of the locking components is a one-way locking engagement.

In this embodiment, as shown in FIGS. 5A-5B, the first and third locking components include one-way crown gears that engage to prevent the third locking component 392 from rotating in one rotational direction, namely the second rotational direction 334, while slipping is permitted in the other rotational direction, namely the first rotational direction 318. At least slight travel of the third locking component along the axis 304 relative to the first spool 314 is permitted against the elastic force of a wave spring, as shown in FIGS. 6A-6B, to facilitate slipping between the third locking component and first locking component as the first spool is rotated in the first rotational direction.

Figure 6A:
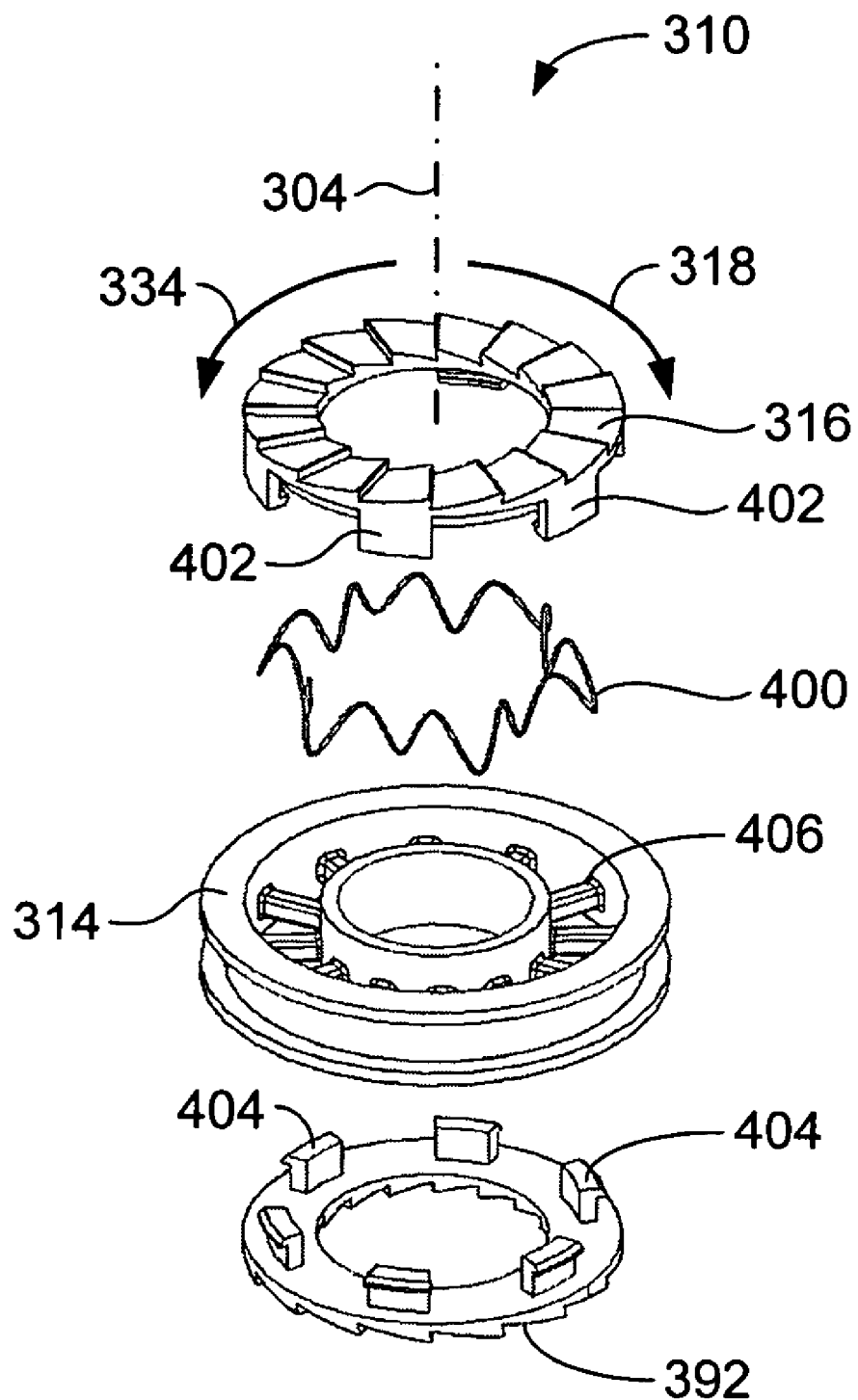
FIG. 6A is an exploded view of a spool assembly according to an embodiment of the invention.
Figure 6B:
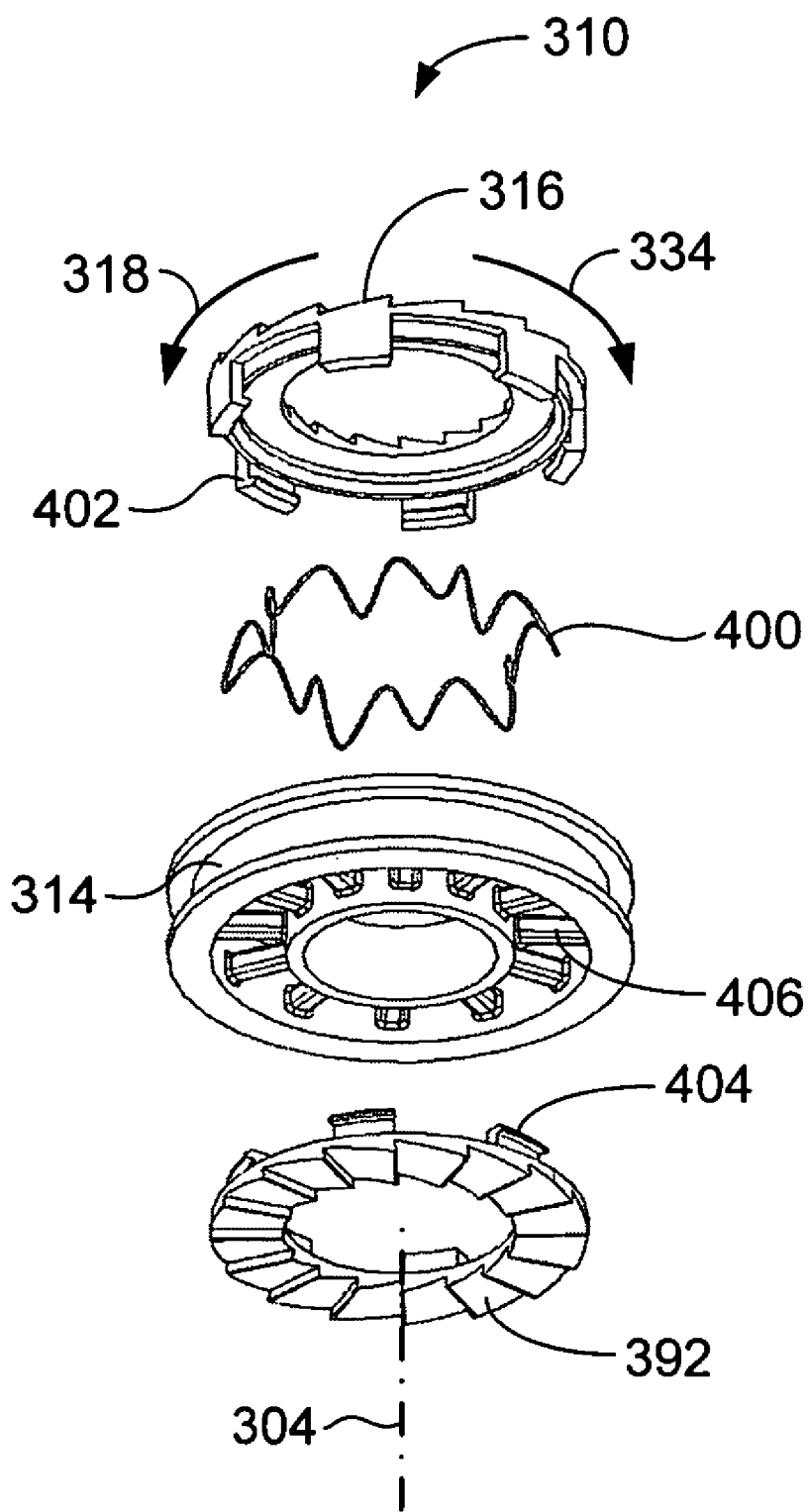
FIG. 6B is another exploded perspective view of the spool assembly of FIG. 6A.

As shown in FIGS. 6A-6B, the first spool assembly 310 includes the first spool 314, the third driving component 316 coupled to the first spool, the third locking component 392 coupled to the first spool, and a wave spring 400 for biasing the third driving component and third locking component outward from the first spool. Retention fingers 402 depend from the third driving component 316 along the axis 304 toward the first spool 314. Similarly, retention fingers 404 depend from the third locking component 392 along the axis 304 toward the first spool 314. Spaces between regularly spaced spokes 406 of the first spool allow passage of the retention fingers 402,404. The wave spring and first spool are captured between the third driving component 316 and third locking component 392 when the retention fingers 402 engage the retention fingers 404.

The third driving component 316 (FIG. 6A) is biased away from the first spool 314 and toward the first driving component 306 (FIG. 5A) of the axle by an elastic force of the wave spring 400. Furthermore, the third locking component 392 (FIG. 6A) is biased away from the first spool 314 and toward the first locking component 390 (FIG. 5B) of the housing by an elastic force of the wave spring. Thus the elastic forces of the biasing spring 370 (FIGS. 4A-4B) and wave spring 400 generally maintain abutment of the first spool assembly with the first driving component of the axle and the first locking component of the housing.

However, when a pulling force externally applied to the control handle 382 overcomes the elastic force of the spring 370 and displaces the axle 302 along the axis 304 and away from the housing 336, the first spool assembly loses abutment with the first driving component and first locking component. A release position of the axle is thereby obtained and defined. As the axle is pulled from the housing until the capture flange 368 of the retention cap 346 abuts the capture flange 364 of the base cylinder 360 (FIG. 4B), the first spool assembly 310, retained on the first axle portion 380 (FIG. 5A) by the capture teeth 384, travels with the axle and loses abutment with the first locking component 390 (FIG. 5B). Furthermore, travel of the first spool assembly with the axle is limited by the capture teeth 342 of the housing 336 such that abutment with the first driving component 306 is lost. Thus, when the release position of the axle is obtained, the first spool assembly, captured between the capture teeth 384 (FIG. 5A) of the axle and the capture teeth 342 (FIG. 5B) of the housing, is freely rotatable about the first axle portion 380 (FIG. 5A).

With regard to rotation of the first spool assembly 310 (FIG. 4A-4B) in the first rotational direction 318, in summary, when the axle 302 obtains the drive position as biased by the biasing spring 370, the first driving component 306 of the axle abuts the third driving component 316 of the first spool assembly. Furthermore, when the control handle is rotated in the first rotational direction 318, the first spool 314 is thereby rotated in the first rotational direction. Any flexible lines attached to the first spool are thereby wound about the first spool. For example, two flexible lines (not shown) are preferably attached to the first spool 314 and extend therefrom through holes 406 (FIG. 5A-5B) formed in the circular wall 338 of the housing 336. As the first spool 314 is rotated in the first rotational direction 318 by rotation of the control handle, the lengths of the lines that extend from the housing 336 are shortened. Subsequent withdrawal of the lines from the housing are prevented by engagement of the third locking component 392 (FIG. 5A) of the first spool 314 with the first locking component 390 (FIG. 5B) of the housing 336 as long as the axle 302 is maintained in the drive position. In this regard, operation of the bi-directional device 300 of FIGS. 4A-4B is essentially the same as operation of the bi-directional device 200 of FIGS. 2A-2B.

With regard to releasing the first spool assembly to allow withdrawal of flexible lines from the housing, when the control handle is displaced along the axis 304 into the release position, the first spool assembly, captured between the capture teeth 384 (FIG. 5A) of the first axle portion 380 and the capture teeth 342 (FIG. 5B) of the housing, is freely rotatable about the first axle portion 380. In this regard, operation of the bi-directional device 300 of FIGS. 4A-4B is essentially the same as operation of the bi-directional device 200 of FIGS. 2D-2E.

Figure 7A:
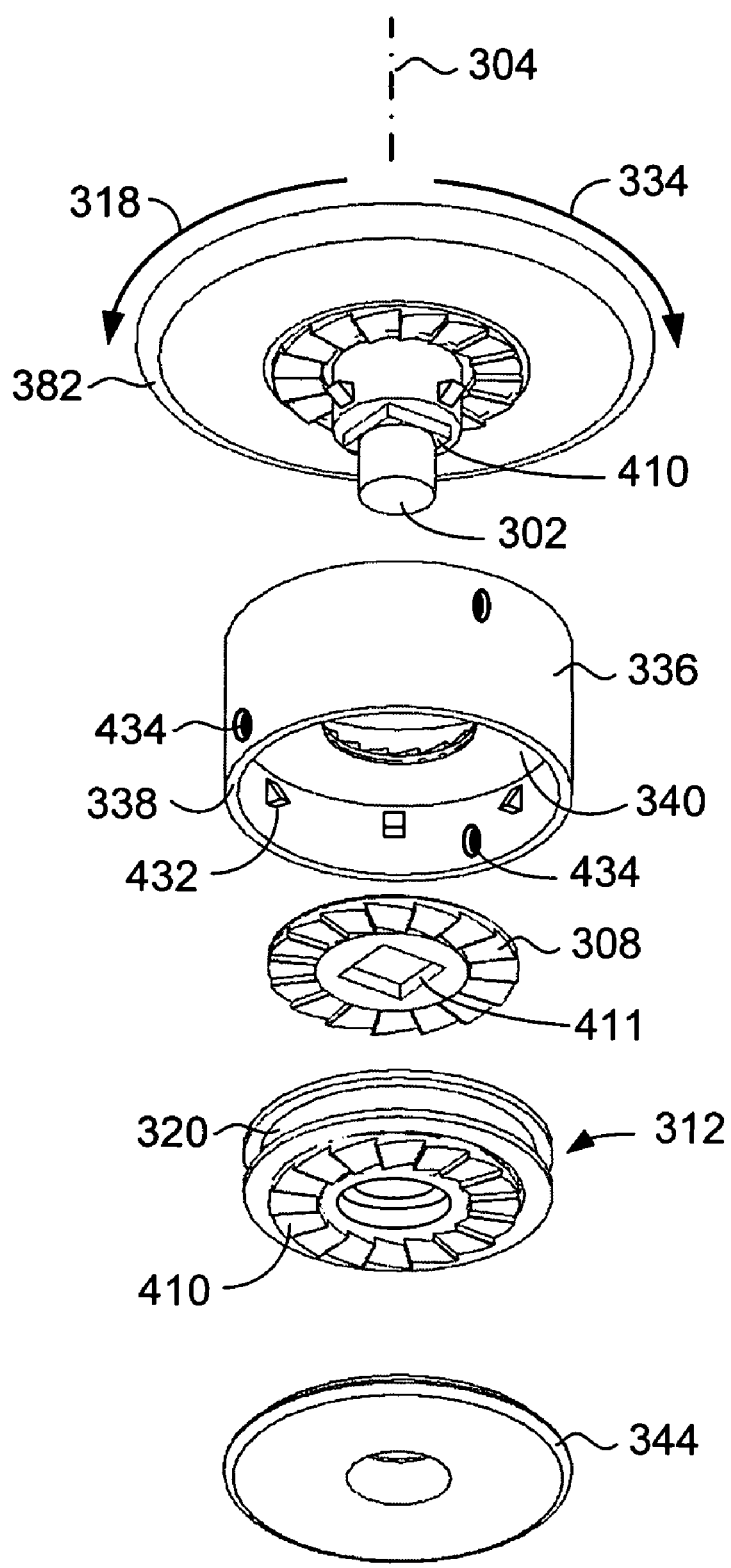
FIG. 7A is an exploded perspective view of particular components of the bi-directional device of FIG. 4A.
Figure 7B:
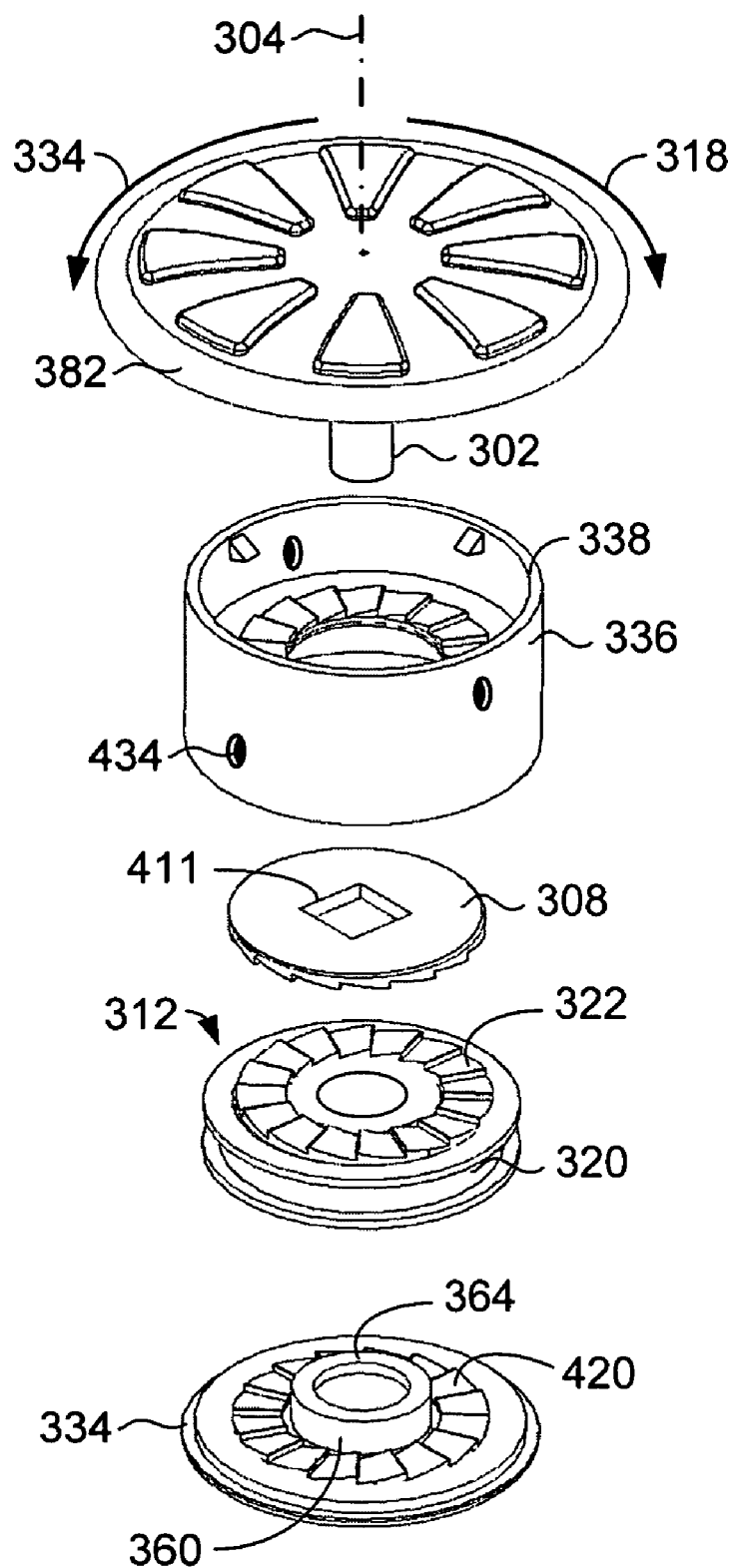
FIG. 7B is another exploded perspective view of the components of FIG. 7A.

As shown in FIGS. 7A-7B, the axle 302 has a drive stage 410 for rotating the second driving component 308 with the axle. A drive aperture 411 is formed through the second driving component and receives the drive stage 410 of the axle in a press fit attachment when the device is assembled. The press fit attachment of the second drive component with the drive stage can be assisted by adhesive, set screws, welding, or other attachment. Thus, the second driving component 308, retained by the axle, travels and rotates with the axle when the control handle is rotated about the axis 304 and positioned along the axis 404. With the axle in the drive position, the second driving component 308 abuts the fourth driving component 322 of the second spool assembly 312. When the axle is rotated in the second rotational direction 334, the second driving component 308 engages the fourth driving component 322 and thereby rotates the second spool 320 in the second rotational direction. However, when the axle 302 is rotated in the first rotational direction 318, the second spool 320 is not rotated.

In this embodiment, as shown in FIGS. 7A-7B, the second and fourth driving components 308,322 include one-way crown gears that engage when the second driving component 308 is rotated in one rotational direction, namely the second rotational direction 334. Slipping is permitted between the second and fourth driving components when the second driving component is rotated in the other rotational direction, namely the first rotational direction 318. At least slight travel of the fourth driving component along the axis 304 is permitted against the elastic force of a wave spring, as shown in FIGS. 8A-8B, to facilitate slipping between the second driving component and fourth driving component when the axle is rotated in the first rotational direction 318.

As further shown in FIGS. 7A-7B, a second locking component 420 (FIG. 7B) is attached to the base 344 facing the second spool assembly 312. A fourth locking component 410 (FIG. 7A) is coupled to the second spool 320 facing the second locking component 420. When the axle 302 obtains the drive position, the fourth locking component 410 abuts the second locking component 420 thereby preventing the second spool 320 from rotating in the first rotational direction 318 about the axis 304. As the second spool 320 is rotated in the second rotational direction 334, the fourth locking component 410 slips relative to the second locking component 420. That is, though abutment of the fourth locking component 410 and second locking component 420 is maintained when the axle 302 obtains the drive position, the engagement of the locking components is a one-way locking engagement.

In this embodiment, as shown in FIGS. 7A-7B, the second and fourth locking components 420 (FIG. 7B), 410 (FIG. 7A) include one-way crown gears that engage to prevent the fourth locking component from rotating in one rotational direction, namely the first rotational direction 318, while slipping is permitted in the other rotational direction, namely the second rotational direction 334. At least slight travel of the fourth locking component along the axis 304 relative to the second spool 320 is permitted against the elastic force of a wave spring, as shown in FIGS. 8A-8B, to facilitate slipping between the fourth locking component and second locking component as the second spool is rotated in the second rotational direction.

Figure 8A:
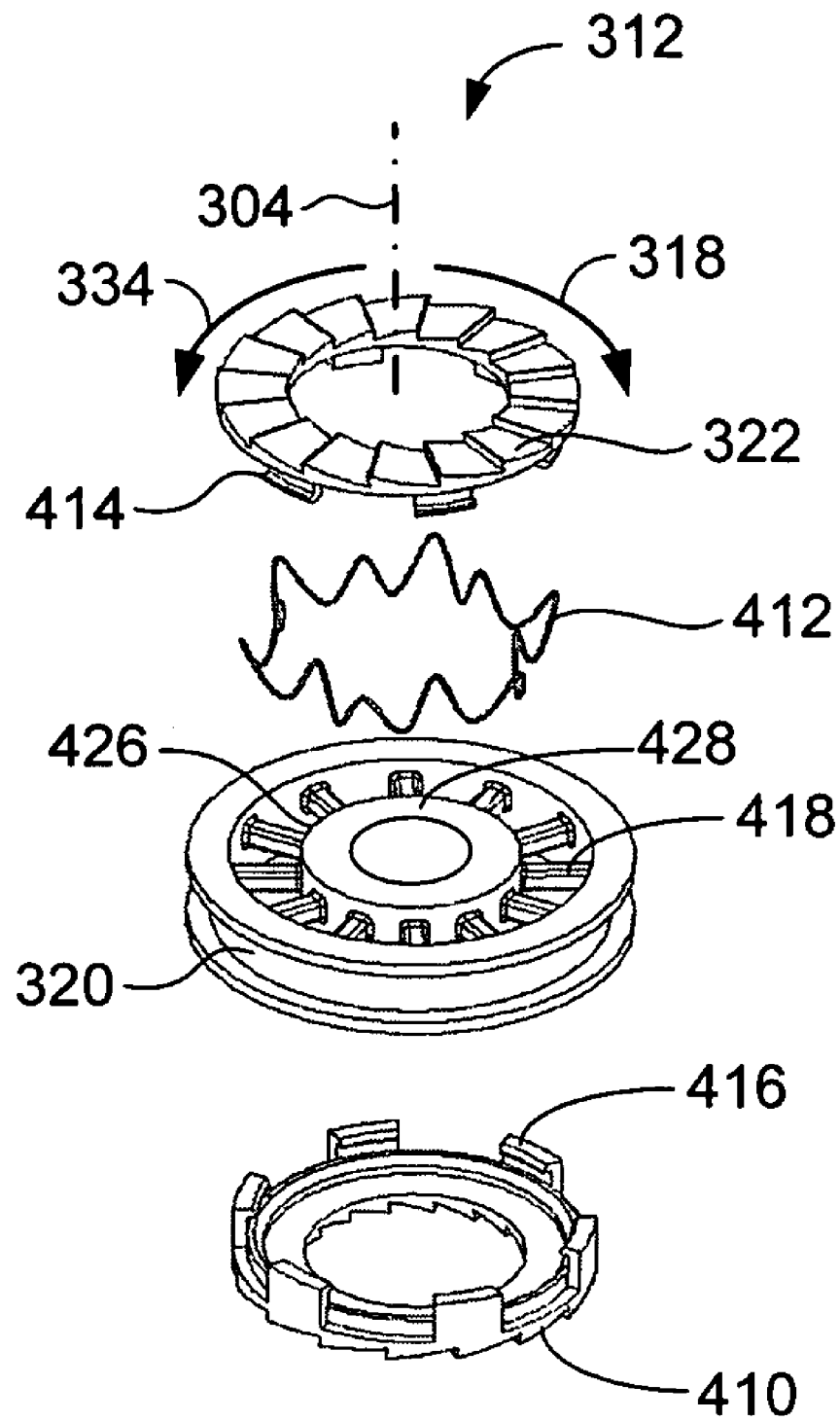
FIG. 8A is an exploded perspective view of another spool assembly according to an embodiment of the invention.
Figure 8B:
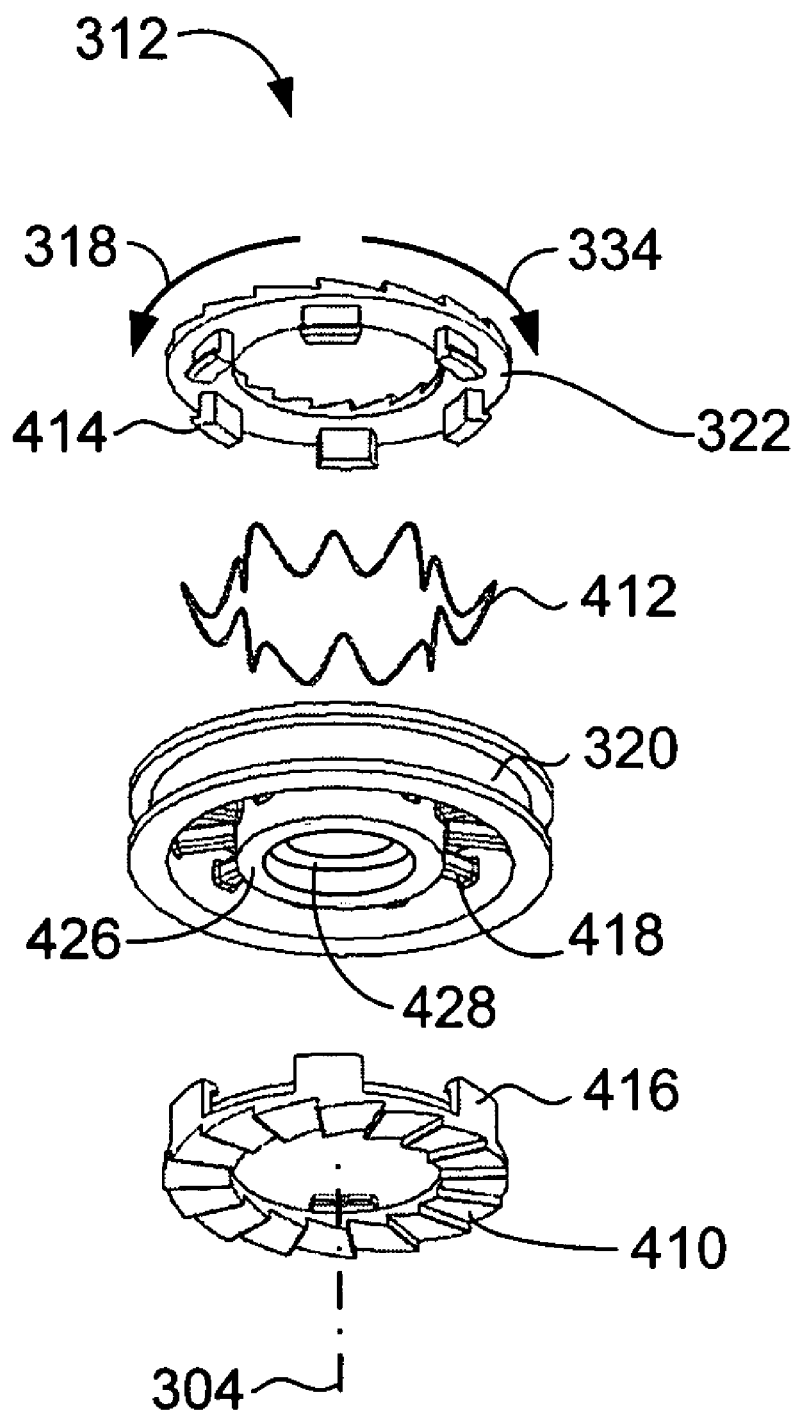
FIG. 8B is another exploded perspective view of the spool assembly of FIG. 8A.

As shown in FIGS. 8A-8B, the second spool assembly 312 includes the second spool 320, the fourth driving component 322 coupled to the first spool, the fourth locking component 410 coupled to the second spool, and a wave spring 412 for biasing the fourth driving component and fourth locking component outward from the second spool. Retention fingers 414 depend from the fourth driving component 422 along the axis 304 toward the second spool 320. Similarly, retention fingers 416 depend from the fourth locking component 410 along the axis 304 toward the second spool 320. Spaces between regularly spaced spokes 418 of the second spool allow passage of the retention fingers 414, 416 therethrough for mutual interlocking engagement of the fingers. The wave spring 412 and second spool 320 are captured between the fourth driving component 322 and fourth locking component 410 when the retention fingers 414 engage the retention fingers 416.

The spokes 418 of the second spool 320 radiate outward from a central hub 426 (FIG. 8B) that is rotatable about the base cylinder 360 of the base 344 (FIG. 4B). An abutment flange 428 extends radially inwardly from central hub 426 (FIG. 8A-8B) at an end of the hub that faces the fourth driving component 322. The abutment flange 428 allows passage and rotation of the axle 302 but is dimensioned to abut an abutment surface 430 of the retention cap 346 (FIG. 4B) and prevent passage of the retention cap.

The fourth driving component 322 is biased away from the second spool 320 and toward the second driving component 308 (FIG. 7A) by an elastic force of the wave spring 412 (FIG. 8A-8B). Furthermore, the wave spring 412 biases the fourth locking component 410 (FIG. 4A) away from the second spool 320 and toward the second locking component 420 (FIG. 4B) of the base 344. The biasing spring 370 (FIGS. 4A-4B) biases the axle 302 toward the base 344 and thus biases the second driving component 308 toward the base and the second spool assembly 312. Thus the elastic forces of the biasing spring 370 (FIGS. 4A-4B) and wave spring 412 (FIGS. 8A-8B) generally maintain abutment of the second spool assembly 312 with the second driving component 308 of the axle and the second locking component 420 of the base 344.

However, when a pulling force externally applied to the control handle 382 overcomes the elastic force of the spring 370, displacing the axle 302 along the axis 304 away from the housing 336, the release position of the axle is obtained such that the second spool assembly loses abutment with the second locking component and second driving component. In particular, as the axle 302 is pulled from the housing until the capture flange 368 of the retention cap 346 abuts the capture flange 364 of the base cylinder 360 (FIG. 4B), the abutting surface 430 of the retention cap 346 abuts the abutment flange 428 (FIG. 8A-8B) of the second spool thereby displacing the second spool assembly 312 along the axis 304 toward the annular flange 340 (FIG. 7A) of the housing 336 causing abutment of the second spool assembly and second locking component 420 (FIG. 7B) to be lost. Furthermore, as the axle 302 is pulled from the housing, the second driving component 308 loses abutment with the second spool assembly 312 because travel of the second spool 320 toward the annular flange 340 (FIG. 7A) is limited by a number of capture teeth 432 extending radially inward from the wall 338 of the housing 336. The capture teeth 432 are dimensioned such that passage of the second driving component 308 is permitted but passage of the second spool 320 is prevented. Thus, when the release position of the axle is obtained, the second spool assembly, captured between the abutting surface 430 of the retention cap 346 (FIG. 4B) and the capture teeth 432 (FIG. 7A) of the housing, is freely rotatable about the axle 302 and base cylinder 360 (FIG. 4B).

With regard to rotation of the second spool assembly 312 (FIG. 4A-4B) in the second rotational direction 334, in summary, when the axle 302 obtains the drive position as biased by the biasing spring 370, the second driving component 308 attached to the axle abuts the fourth driving component 322 of the second spool assembly. Furthermore, when the control handle 382 is rotated in the second rotational direction 334, the second spool 320 is thereby rotated in the second rotational direction. Any flexible lines attached to the second spool are thereby wound about the second spool. For example, two flexible lines (not shown) are preferably attached to the second spool 320 and extend therefrom through holes 434 (FIG. 7A-7B) formed in the circular wall 338 of the housing 336. As the second spool 320 is rotated in the second rotational direction 334 by rotation of the control handle, the lengths of the lines that extend from the housing 336 are shortened. Subsequent withdrawal of the lines from the housing are prevented by engagement of the fourth locking component 410 (FIG. 4A) of the second spool 320 with the second locking component 420 (FIG. 4B) of the base 344 as long as the axle 302 is maintained in the drive position. In this regard, operation of the bi-directional device 300 of FIGS. 4A-4B is essentially the same as operation of the bi-directional device 200 of FIGS. 2A and 2C.

With regard to releasing the second spool assembly to allow withdrawal of flexible lines from the housing, when the control handle is displaced along the axis 304 into the release position, the second spool assembly, captured between the abutment surface 430 of the retention cap 346 (FIG. 4B) and the capture teeth 432 of the housing 336 (FIG. 7A), is freely rotatable about the axle 302 and base cylinder 360. In this regard, operation of the bi-directional device 300 of FIGS. 4A-4B is essentially the same as operation of the bi-directional device 200 of FIGS. 2D-2E.

Figure 9A:
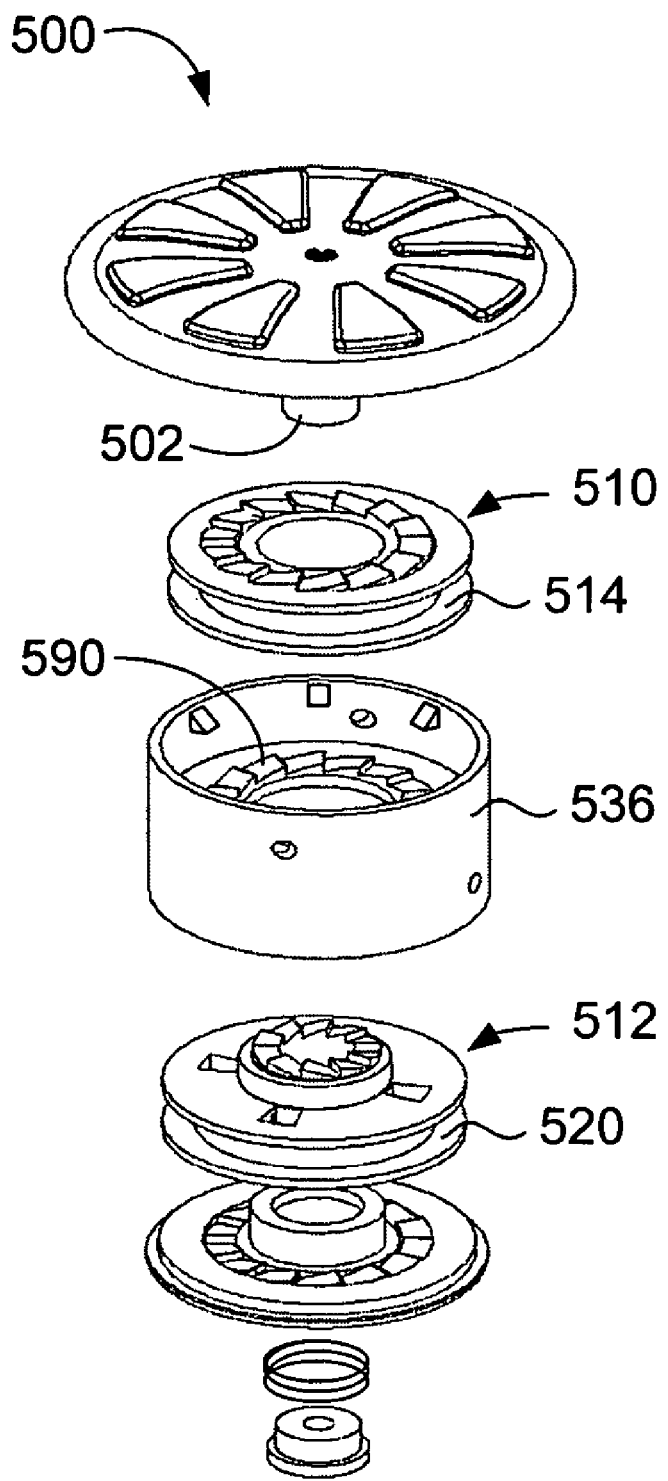
FIG. 9A is an exploded perspective view of a bi-directional device according to another embodiment of the invention.
Figure 9B:
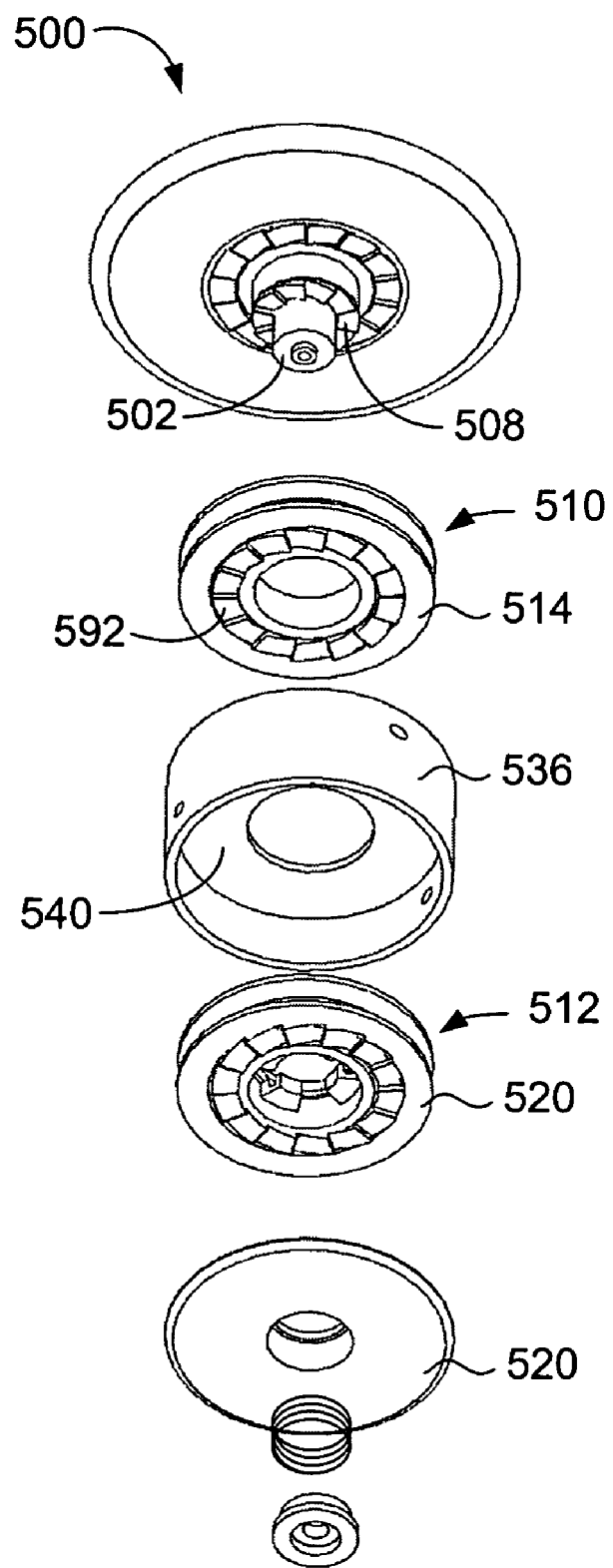
FIG. 9B is another exploded perspective view of the bi-directional device of FIG. 9A.

Yet another embodiment of a bi-directional device 500 is shown in FIGS. 9A-9B. In this embodiment, a first spool assembly 510 is constructed and is operational much like the first spool assembly 310 of the bi-directional device 300 of FIGS. 4A-4B. However, in this embodiment, the first spool assembly 510 is not retained on an axle portion by retention teeth for displacing the first spool when the release position of the axle is obtained. In this embodiment, an abutting surface 529 (FIGS. 10A-10B) of the second spool assembly 512 passes through the annular flange 540 (FIG. 9B) of the housing 536, abuts the first spool 514, and displaces the locking component 592 (FIG. 9B) of the first spool assembly 510 from the locking component 590 (FIG. 9A) when the axle obtains the release position. Nonetheless, insofar as a pair of flexible lines (not shown) is attached to the first spool 514, operation of the bi-directional device 500 of FIGS. 9A-9B, with regard to the first spool assembly 510, is essentially the same as operation of the bi-directional device 200 of FIGS. 2A, 2B, 2D, and 2E.

Figure 10A:
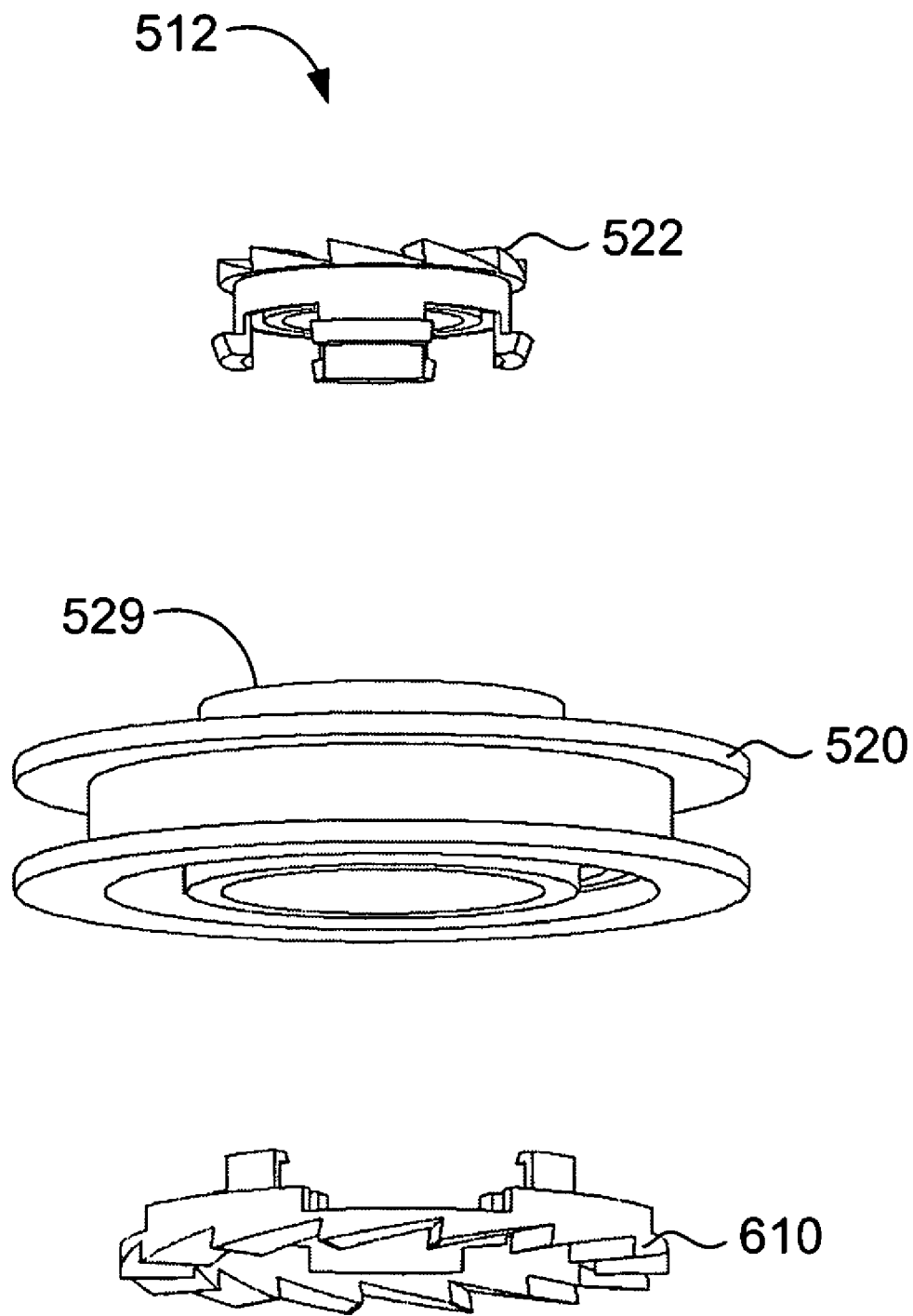
FIG. 10A is an exploded perspective view of a spool assembly according to an embodiment of the invention.
Figure 10B:
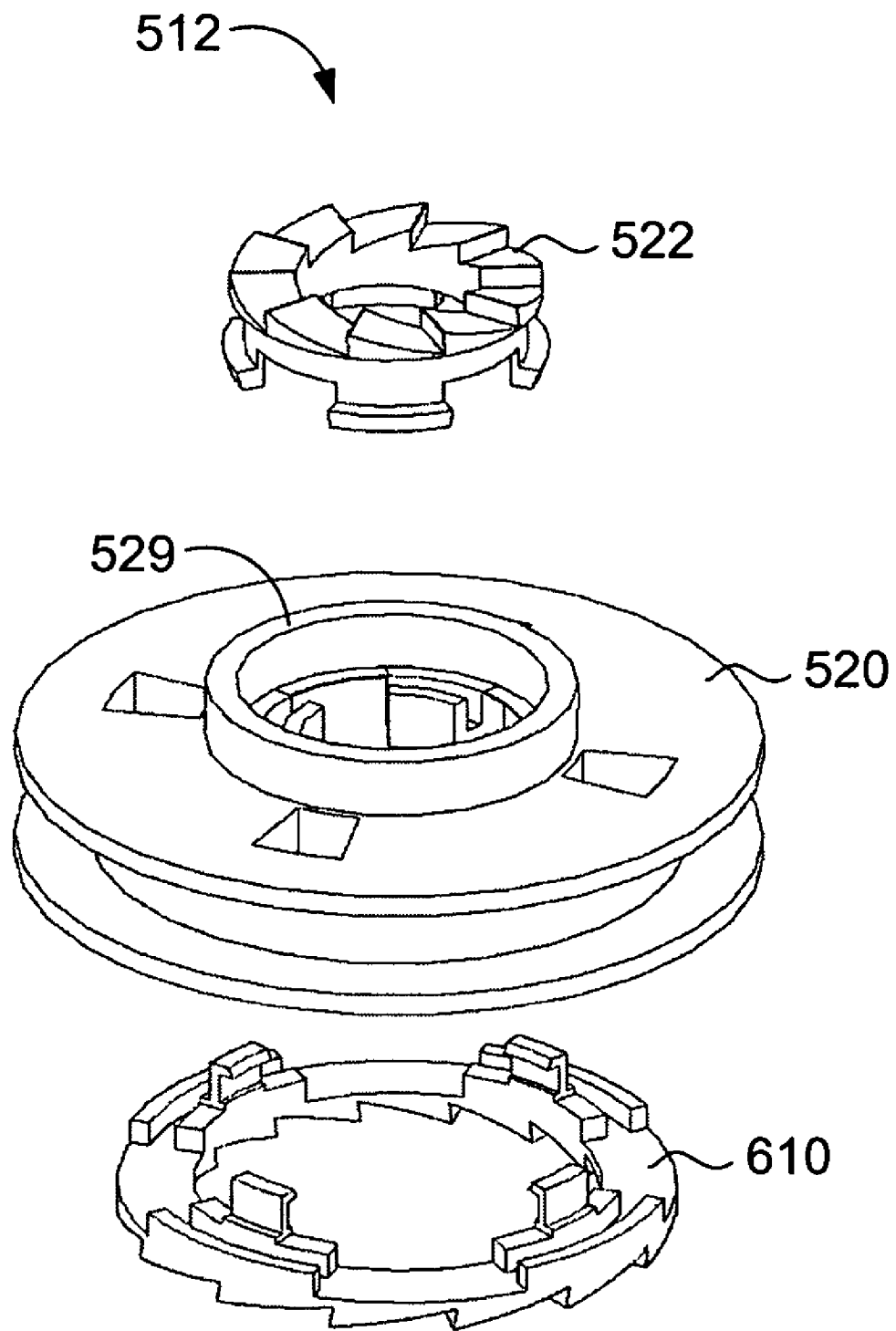
FIG. 10B is another exploded perspective view of the spool assembly of FIG. 10A.

Furthermore, in this embodiment, the second driving component 508 attached to the axle 502 is passable through the annular flange 540 (FIG. 9B) and abuts the fourth driving component 522 (FIG. 10A) of the second spool assembly 512 when the axle obtains the drive position. As shown in FIGS. 10A-10B, the fourth driving component 522 and fourth locking component 610, having different diameters, each separately couple to the second spool 520, and are each biased away from the second spool by one or more springs (not shown). Insofar as a pair of flexible lines (not shown) is attached to the second spool 520, operation of the bi-directional device 500 of FIGS. 9A-9B, with regard to the second spool assembly 510, is essentially the same as operation of the bi-directional device 200 of FIGS. 2A, 2C, 2D, and 2E.

On the other hand, insofar as a single flexible line (not shown) is attached to the first spool 514 and a single flexible line is attached to the second spool 520, operation of the bi-directional device 500 of FIGS. 9A-9B is essentially the same as operation of the bi-directional device 100 of FIGS. 1A-1F.

While those embodiments of the invention described above relate to bi-directional devices, yet other embodiments of the invention relate to articles of protective apparel having bi-directional devices. In particular, several embodiments of protective helmets are described below.

Figure 11A:
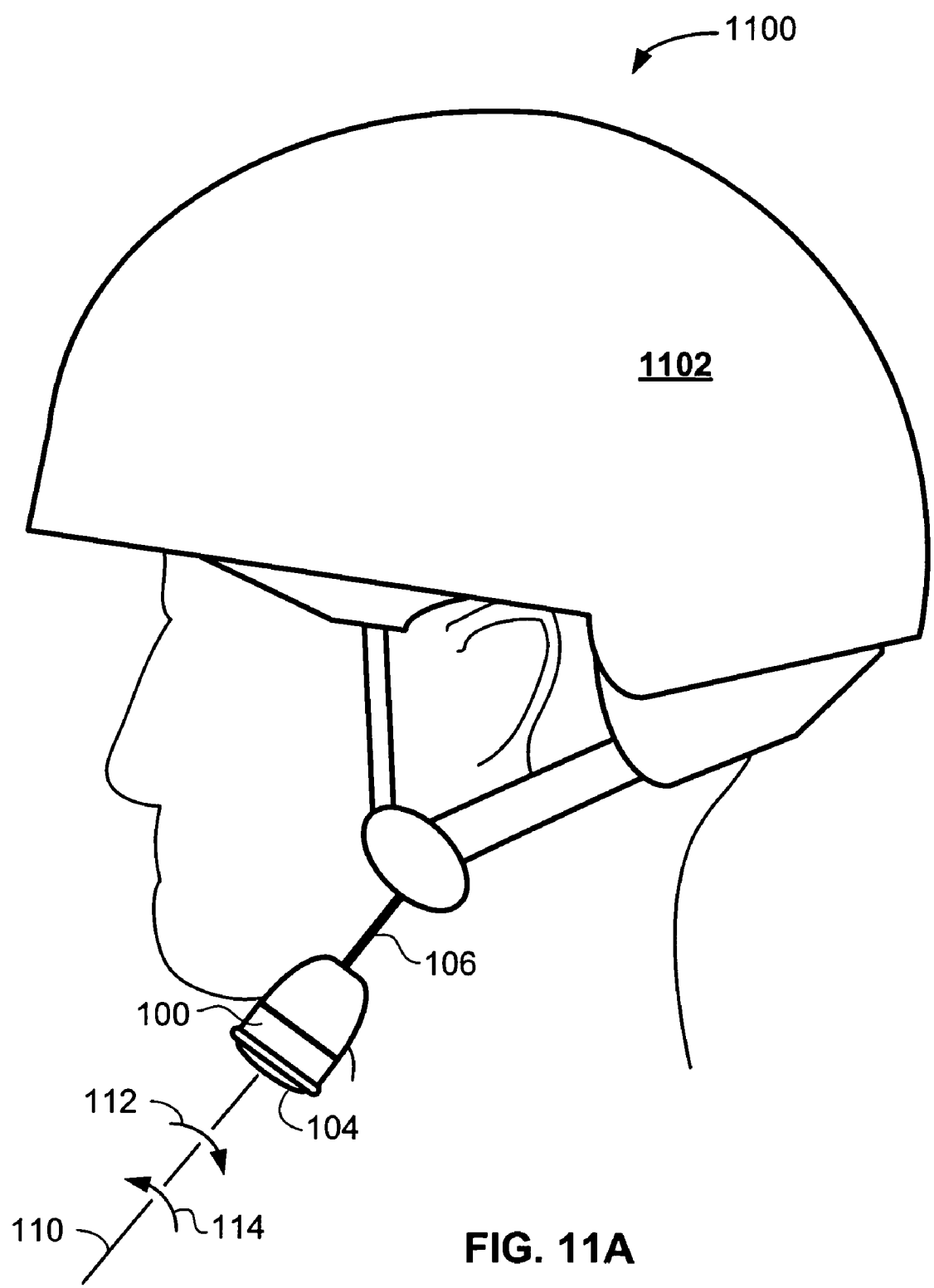
FIG. 11A is a left side view of a helmet having a bi-directional device according to an embodiment of the invention.
Figure 11B:
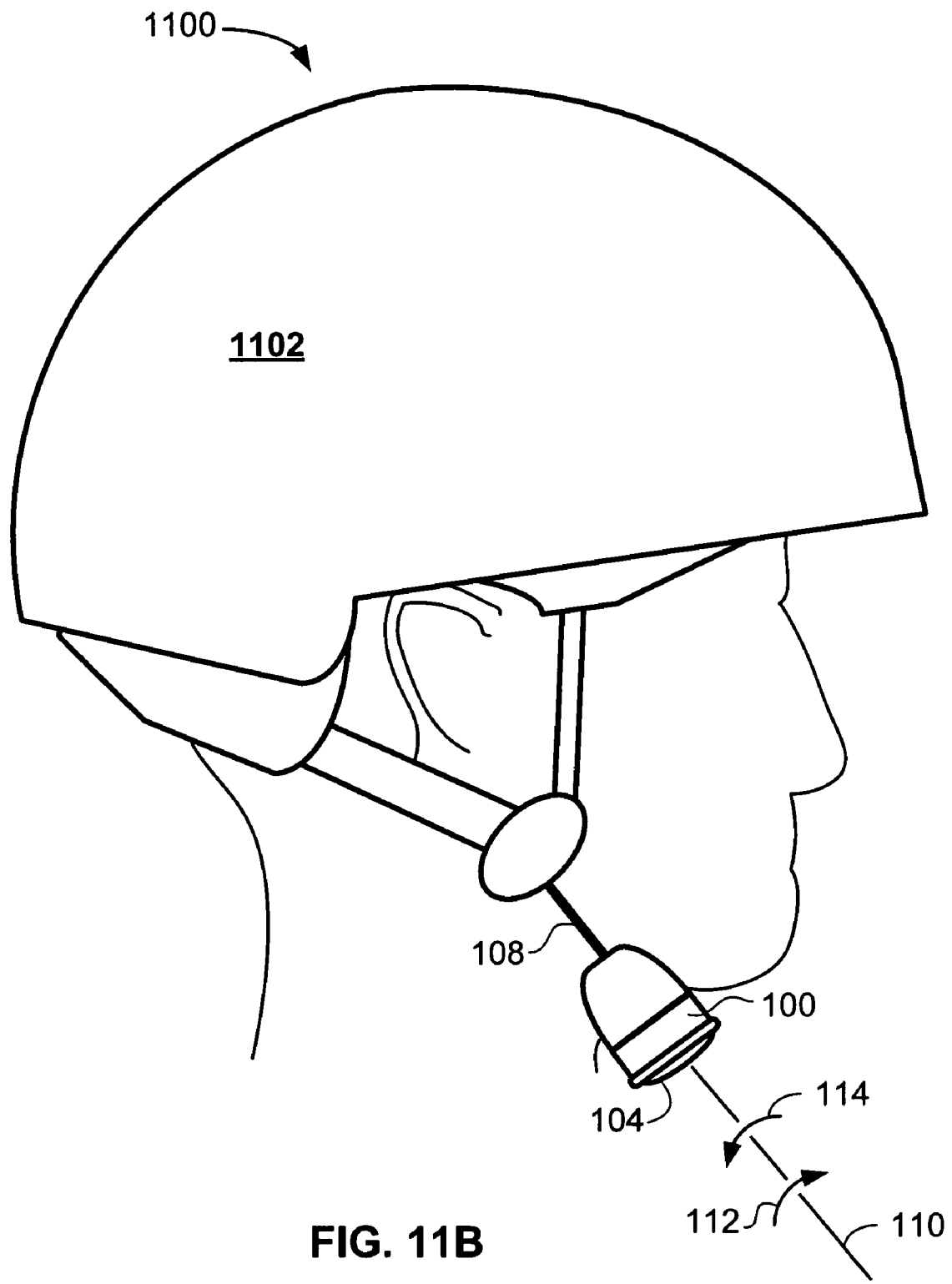
FIG. 11B is a right side view of the helmet of FIG. 11A.

In FIGS. 11A-11B, a helmet 1100 according to the invention includes a shell 1102 for placement on and protection of the head of a user, a first line 106 (FIG. 11A) extending from the shell, a second line 108 (FIG. 11B) extending from the shell, and a bi-directional device 100 (see also FIG. 1A) having a control handle 104 that is rotatable about an axis 110 relative to the device 100. When the control handle 104 is rotated in a first rotational direction 112 about the axis 110, at least a portion of the first line 106 (FIG. 11A) is drawn into the bi-directional device thereby shortening the length of the first line extending from the device.

Furthermore, when the control handle 104 is rotated in a second rotational direction 114 about the axis 110, at least a portion of the second line 108 (FIG. 11B) is drawn into the bi-directional device thereby shortening the length of the second line extending from the device. In this embodiment, the first line, second line, and bi-directional device define an adjustable chin strap for retaining the helmet on the head of the user. The chin strap is capable of being tightened by the user by manual rotation of the control handle.

Furthermore, the control handle 104 is positionable along the axis 110 into a release position (FIGS. 1E-1F), whereby the chin strap defined by the first line, second line, and bi-directional device can be loosened.

Figure 12A:
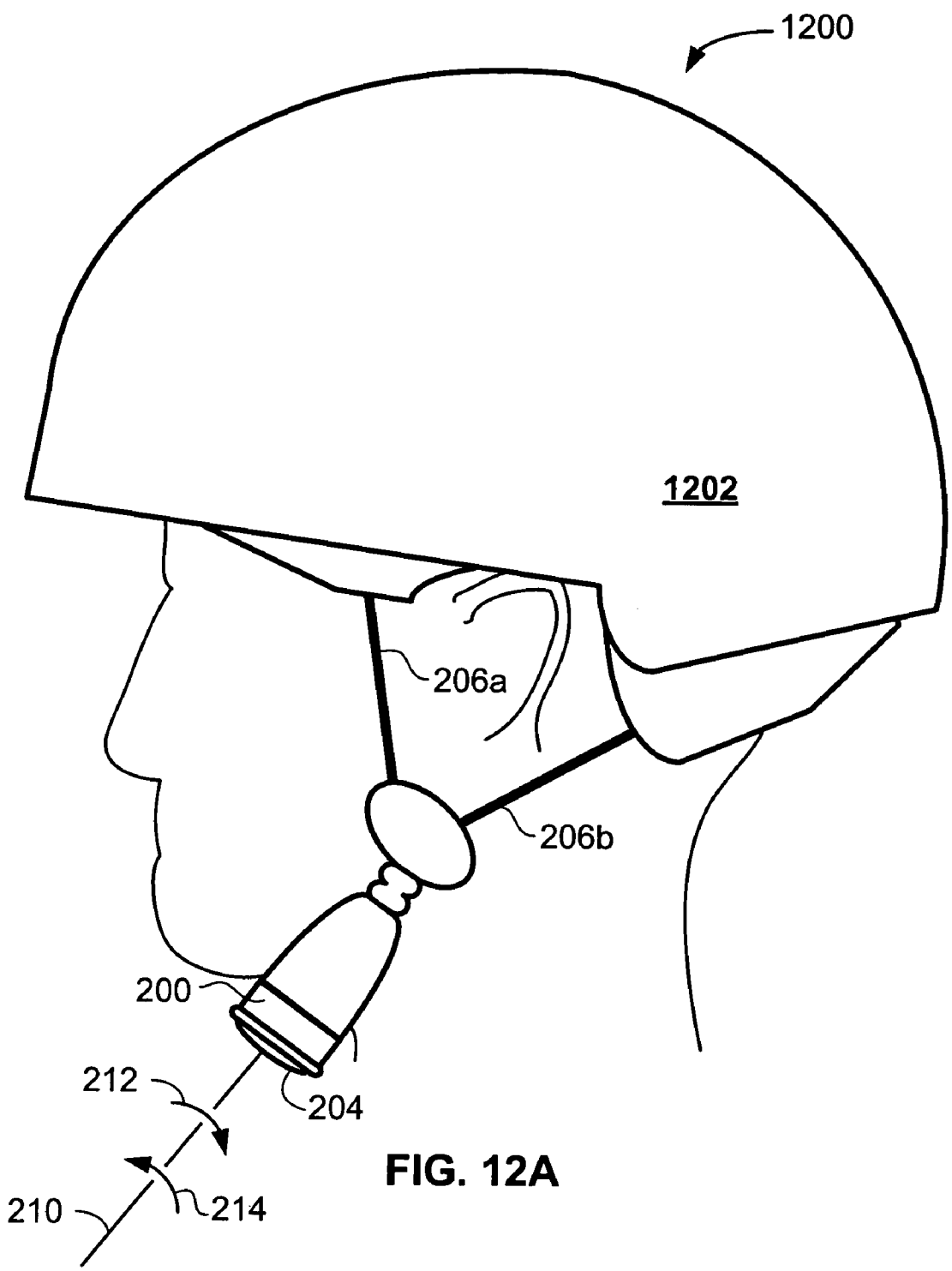
FIG. 12A is a left side view of another helmet having a bi-directional device according to an embodiment of the invention.
Figure 12B:
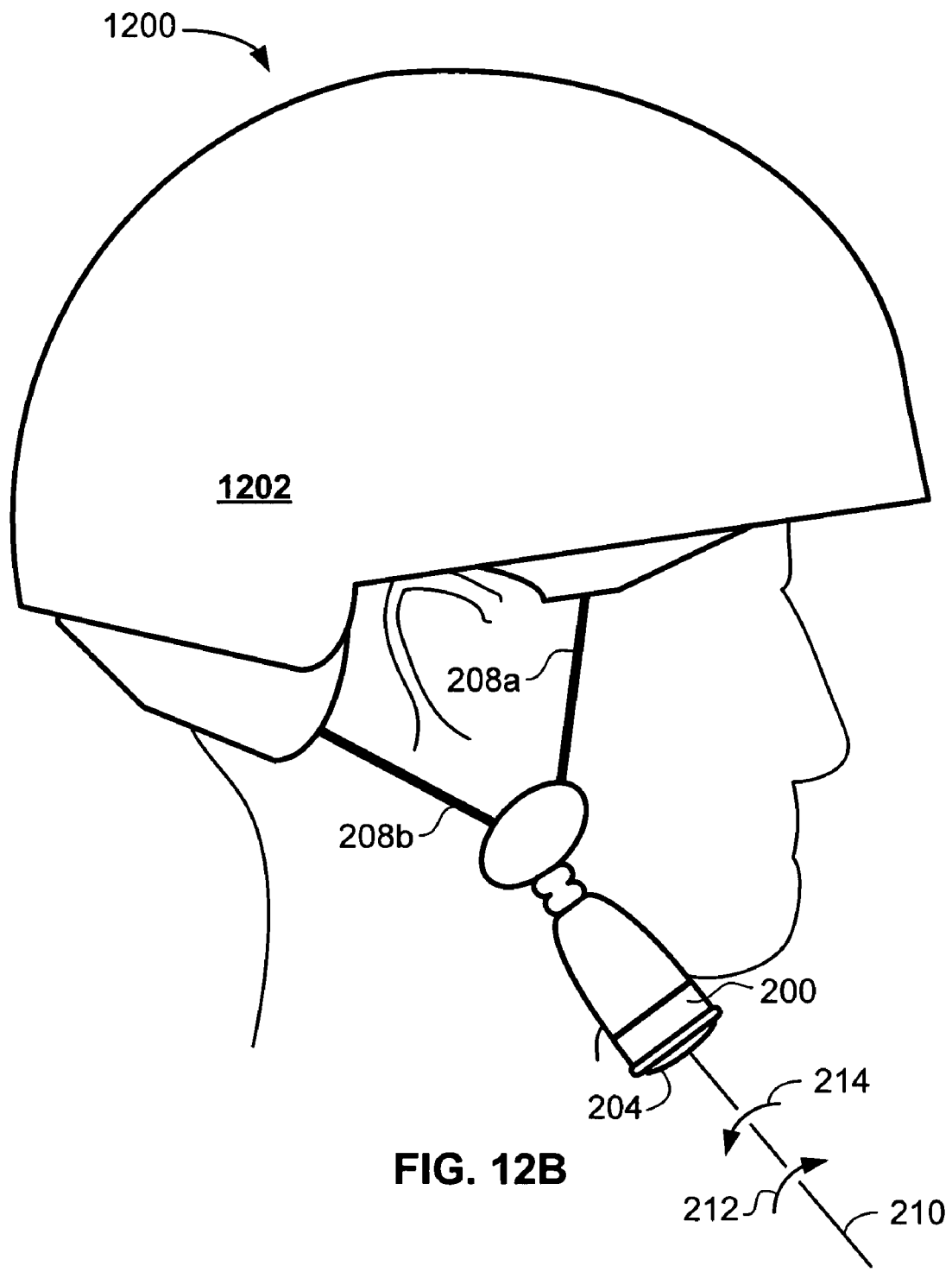
FIG. 12B is a right side view of the helmet of FIG. 12A.

In FIGS. 12A-12B, a helmet 1200 according to the invention includes a shell 1202 for placement on and protection of the head of a user, a first line 206a and a third line 206b (FIG. 12A) extending from the shell, a second line 208a and a fourth line 208b (FIG. 12B) extending from the shell, and a bi-directional device 200 (see also FIG. 2A-2E) having a control handle 204 that is rotatable about an axis 210 relative to the device 200. When the control handle 204 is rotated in a first rotational direction 212 about the axis 210, at least portions of the first line 206a and third line 206b are drawn into the bi-directional device thereby shortening the length of the first and third lines extending from the device. In this embodiment, the first line and third line define a left chin strap (FIG. 12A). The left chin strap is capable of being tightened by the user by manual rotation of the control handle in the first rotational direction.

Furthermore, when the control handle 204 is rotated in a second rotational direction 214 about the axis 210, at least portions of the second line 208a and fourth line 208b are drawn into the bi-directional device thereby shortening the lengths of the second and fourth lines extending from the device. In this embodiment, the second line and fourth line define a right chin strap (FIG. 12B). The right chin strap is capable of being tightened by the user by manual rotation of the control handle in the second rotational direction.

Furthermore, the control handle 204 is positionable along the axis 210 into a release position (FIGS. 2D-2E), whereby the left and right chin straps can be loosened.

In another embodiment of a helmet, not shown, the first and third lines 206a,206b extend from the bi-directional device 200 and pass forward of the left and right ears, respectively, as forward straps. Also, the second and fourth lines 208a,208b extend from the bi-directional device 200 and pass rearward of the left and right ears, respectively, as rearward straps. In this embodiment, rotation of the control handle in the first rotational direction effects tightening of the first and third lines thereby adjusting the forward placement of the helmet on the head of the user. Similarly, rotation of the control handle in the second rotational direction effects tightening of the second and fourth lines thereby adjusting the aft placement of the helmet on the head of the user. Furthermore, when the control handle is positioned at the release position (FIGS. 2D-2E), forward and aft placement of the helmet are loosened.

Figure 13:
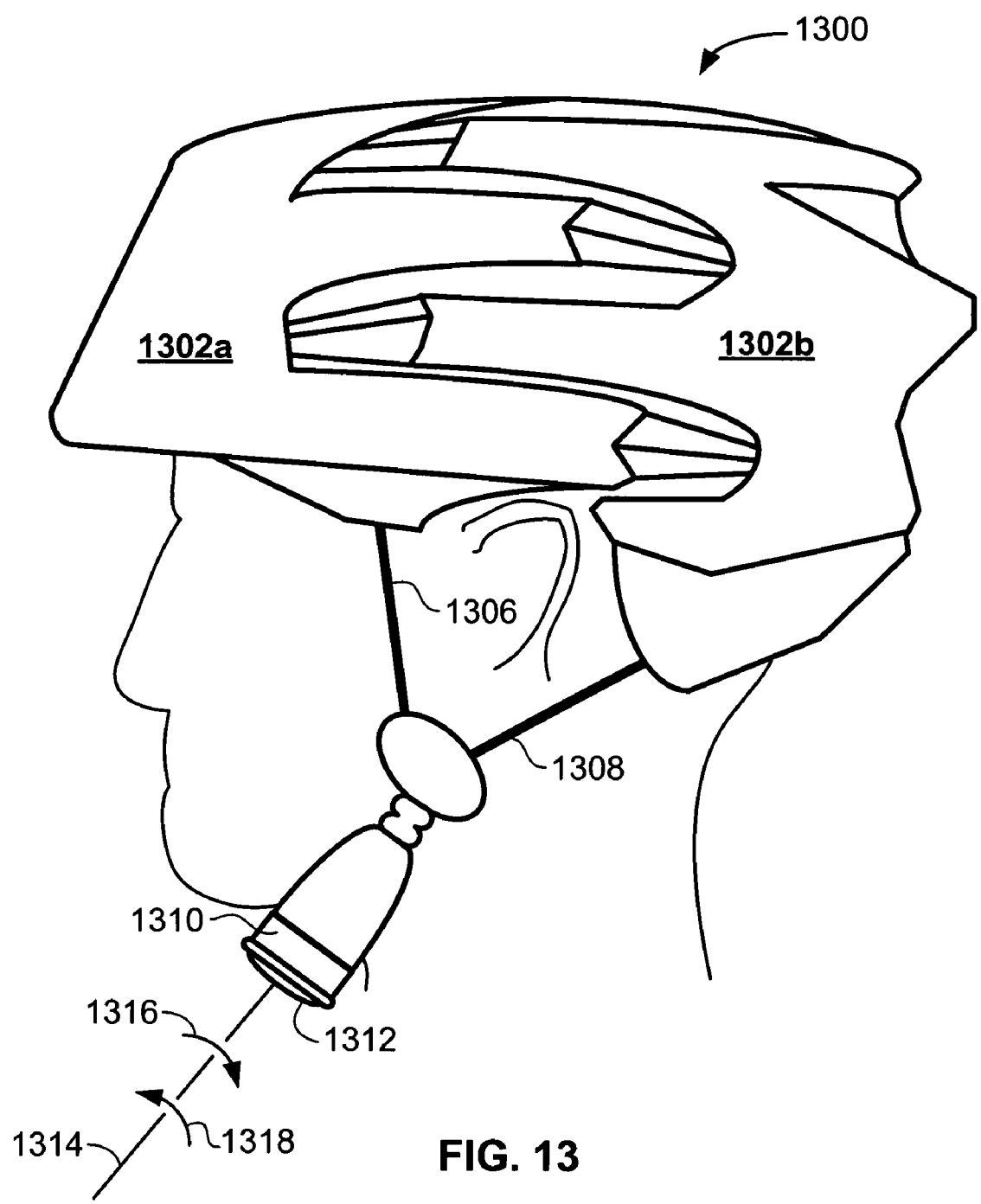
FIG. 13 is a left side view of yet another helmet having a bi-directional device according to an embodiment of the invention.

In FIG. 13, an adjustable helmet 1300 according to the invention includes a first shell portion 1302a for placement on and protection of a first portion of the cranium of a user, a second shell portion 1302b for placement on and protection of a second portion of the cranium of a user, a first line 1306 extending from the shell first shell portion, a second line 1308 extending from the second shell portion, and a bi-directional device 1310 having a control handle 1312 that is rotatable about an axis 1314 relative to the device 1310. When the control handle 1312 is rotated in a first rotational direction 1316 about the axis 1314, at least a portion of the first line 1306 is drawn into the bi-directional device. When the control handle 1312 is rotated in a second rotational direction 1318 about the axis 1314, at least a portion of the second line 1308 is drawn into the bi-directional device. The placement of the helmet 1300 about the head of the user is thereby tightened about the head of the user.

In particular, the spaced relationship of the first and second shell portions is adjustable by way of rotations of the control handle. That is, the forward first shell portion 1302a and the rearward second shell portion 1302b have adjustable relative proximity. As the control handle is rotated in the first rotational direction, the forward first shell portion 1302a is adjusted rearward on the head of the user and toward the rearward second shell portion 1302b. As the control handle is rotated in the second rotational direction, the rearward second shell portion 1302b is adjusted forward on the head of the user and toward the forward shell portion 1302a.

The control handle 1312 is positionable along the axis into a release position. When the control handle 1312 is positioned at the release position, for example by the user pulling the handle away from the bi-directional device 1310, the lines are loosened and the spaced relationship of the shell portions is increased thereby loosening the helmet about the head of the user.

In this embodiment, insofar as only two lines are adjustable by the control handle, the bi-directional device is operated essentially the same as the device 100 of FIG. 1A-1F. Insofar as four lines are adjustable by the control handle, wherein two lines pass about the left ear of the user as shown and two additional lines pass about the right ear, the bi-directional device is operated essentially the same as the device 200 of FIGS. 2A-2E.

What is claimed is:

1. A bi-directional device comprising:
   (a) a housing;
   (b) a control handle extending from the housing;
   (c) a first line extending from the housing; and
   (d) a second line extending from the housing;
   (e) wherein, said control handle is rotatable about an axis in a first rotational direction, whereby at least a portion of said first line is drawn into said housing when said control handle is rotated in the first rotational direction;
   (f) wherein, said control handle is rotatable about said axis in a second rotational direction, whereby at least a portion of said second line is drawn into said housing when said control handle is rotated in the second rotational direction;
   (g) wherein said second rotational direction is opposite said first rotational direction;
   (h) wherein said control handle is positionable along said axis into a drive position;
   (i) wherein, when said control handle is positioned at said drive position, at least a portion of said first line is drawn into said housing when said control handle is rotated in the first rotational direction;
   (j) wherein, when said control handle is positioned at said drive position, at least a portion of said second line is drawn into said housing when said control handle is rotated in the second rotational direction; and
   (k) wherein said control handle is positionable along said axis into a release position, whereby when said control handle is positioned at said release position, at least a portion of said first line is releasable from said housing.

2. The bi-directional device of claim 1, wherein said control handle is biased into said drive position by an elastic force.

3. The bi-directional device of claim 1,
   (l) wherein said control handle is biased into the drive position and away from the release position by an elastic force that biases said control handle toward said housing; and
   (m) wherein the release position of the control handle is obtained by pulling the control handle along said axis away from said housing against the elastic force.

4. A bi-directional device comprising:
   (a) an axle rotatable about an axis;
   (b) a first spool coupled to said axle; and
   (c) a second spool coupled to said axle;
   (d) wherein, when said axle is rotated in a first rotational direction about said axis, said first spool is thereby rotated;
   (e) wherein, when said axle is rotated in a second rotational direction about said axis, said second spool is thereby rotated;
   (f) wherein said second rotational direction is opposite said first rotational direction;
   (g) wherein, when said axle is rotated in the first rotational direction about said axis, said first spool is thereby rotated in the first rotational direction about said axis;
   (h) wherein, when said axle is rotated in the second rotational direction about said axis, said second spool is thereby rotated in the second rotational direction about said axis; and
   (i) wherein said axle is positionable along said axis into a release position whereby said first spool is freely rotatable about said axis in said second rotational direction when said axle is positioned at said release position.

5. The bi-directional device of claim 4,
   (j) wherein said axle is positionable along said axis into a drive position whereby said first spool is rotated in said first rotational direction when said axle is positioned at said drive position and rotated in said first rotational direction.

6. The bi-directional device of claim 5,
   (k) wherein said axle is biased into said drive position and away from said release position by an elastic force.

7. A bi-directional device comprising:
   (a) an axle rotatable about an axis;
   (b) a first driving component attached to said axle;
   (c) a second driving component attached to said axle;
   (d) a first spool assembly comprising:
      (I) a first spool concentric about said axis; and
      (II) a third driving component coupled to said first spool, engagable by said first driving component; and
   (e) a second spool assembly comprising:
      (I) a second spool concentric about said axis; and
      (II) a fourth driving component coupled to said second spool, engagable by said second driving component;
   (f) wherein, when said axle is rotated in a first rotational direction about said axis, said first driving component engages said third driving component thereby rotating said first spool about said axis in the first rotational direction;
   (g) wherein, when said axle is rotated in a second rotational direction about said axis, said second driving component engages said fourth driving component thereby rotating said second spool about said axis in the second rotational direction; and
   (h) wherein said second rotational direction is rotationally opposite said first rotational direction.

8. The bi-directional device of claim 7, further comprising:
   (i) a housing within which said first spool and said second spool are disposed, said housing comprising:
      (I) a first locking component attached to said housing; and
      (II) a second locking component attached to said housing;
   (j) wherein said first spool assembly further comprises a third locking component coupled to said first spool;
   (k) wherein said third locking component is capable of engagement with said first locking component;
   (l) wherein, when said third locking component is engaged with said first locking component, said first spool is prevented from rotating about said axis in the second rotational direction;
   (m) wherein said second spool assembly further comprises a fourth locking component coupled to said second spool;
   (n) wherein said fourth locking component is capable of engagement with said second locking component; and
   (o) wherein, when said fourth locking component is engaged by said second locking component, said second spool is prevented from rotating about said axis in the first rotational direction.

9. The bi-directional device of claim 8, wherein said third locking component is biased toward engagement with said first locking component by an elastic force, and, wherein said fourth locking component is biased toward engagement with said second locking component by an elastic force.

10. The bi-directional device of claim 7, further comprising:
   (i) a housing within which said first spool and second spool are disposed, said housing comprising:
      (I) a continuous substantially circular wall defining a cylindrical interior concentric with said axis; and
      (II) an annular flange extending radially inwardly from said circular wall into said cylindrical interior;
   (j) wherein said annular flange defines an inner circular margin and an outer circular margin each concentric with said axis;
   (k) wherein said annular flange is connected to said circular wall along the outer circular margin of said annular flange;
   (l) wherein said axle passes through the inner circular margin of said annular flange;
   (m) wherein said first spool and second spool are disposed within the cylindrical interior of said circular wall; and
   (n) wherein said annular flange is disposed between said first spool and said second spool.

11. The bi-directional device of claim 7, wherein said first driving component comprises a first crown gear, and, wherein said third driving component comprises a crown gear that is biased by an elastic force to engage said first crown gear.

12. The bi-directional device of claim 7, wherein said first spool assembly comprises two crown gears.

13. The bi-directional device of claim 7, wherein the first driving component, the second driving component, the first spool assembly and the second spool assembly define a dual-spool device, and wherein said dual-spool device comprises eight crown gears.

14. A spool assembly comprising:
   (a) a spool for winding a line thereabout;
   (b) a first crown gear coupled to the spool for rotating said spool;
   (c) a second crown gear coupled to the spool for preventing rotation of said spool;
   (d) a driving gear for engaging said first crown gear; and
   (e) a locking gear for engaging said second crown gear;
   (f) wherein said spool, said first crown gear, said second crown gear, said driving gear, and said locking crown gear are concentric about a common axis;
   (g) wherein said first crown gear is positionable within a range along the common axis relative to said spool;
   (h) wherein said first crown gear is biased away from said spool and toward said driving gear by an elastic force;
   (i) wherein said second crown gear is positionable within a range along the common axis relative to said spool;
   (j) wherein said second crown gear is biased away from said spool and toward said locking gear by an elastic force;
   (k) wherein, when said driving gear is rotated in a first rotational direction about the common axis, said driving gear engages said first crown gear thereby rotating said spool about the common axis in the first rotational direction; and
   (l) wherein, said locking gear engages said second crown gear thereby preventing rotation of said spool in a second rotational direction opposite the first rotational direction.

15. The spool assembly of claim 14,
   (m) wherein said driving gear is positionable along the common axis into a drive position and a release position;
   (n) wherein said driving gear is biased into the drive position by an elastic force;
   (o) wherein, when said driving gear is positioned into the release position, said second crown gear and said locking gear are disengaged whereby rotation of said spool in the second rotational direction is not prevented by said locking gear.

16. The spool assembly of claim 14, further comprising a flexible line attached to said spool whereby rotation of said spool in said first rotational direction winds said flexible line onto said spool.

17. A bi-directional device comprising:
   (a) a housing;
   (b) a control handle extending from the housing;
   (c) a first line extending from the housing; and
   (d) a second line extending from the housing;
   (e) wherein, said control handle is rotatable about an axis in a first rotational direction, whereby at least a portion of said first line is drawn into said housing when said control handle is rotated in the first rotational direction;
   (f) wherein, said control handle is rotatable about said axis in a second rotational direction, whereby at least a portion of said second line is drawn into said housing when said control handle is rotated in the second rotational direction;
   (g) wherein said second rotational direction is opposite said first rotational direction;
   (h) wherein said control handle is positionable along said axis into a drive position;
   (i) wherein, when said control handle is positioned at said drive position, at least a portion of said first line is drawn into said housing when said control handle is rotated in the first rotational direction;
   (j) wherein, when said control handle is positioned at said drive position, at least a portion of said second line is drawn into said housing when said control handle is rotated in the second rotational direction; and
   (k) wherein said control handle is biased into said drive position by an elastic force.

* * * * *